US008657551B2

(12) United States Patent
Andersen et al.

(10) Patent No.: US 8,657,551 B2
(45) Date of Patent: Feb. 25, 2014

(54) YIELDABLE BRACE FOR A VEHICLE AT A LOADING DOCK

(75) Inventors: Jonathan Andersen, Grafton, WI (US); Dave Holm, Kewaskum, WI (US); Timothy Muhl, Slinger, WI (US); Bradley J. Stone, Port Washington, WI (US); Matt Sveum, Wauwatosa, WI (US)

(73) Assignee: Rite-Hite Holding Corporation, Milwaukee, WI (US)

( * ) Notice: Subject to any disclaimer, the term of this patent is extended or adjusted under 35 U.S.C. 154(b) by 1234 days.

(21) Appl. No.: 11/772,445

(22) Filed: Jul. 2, 2007

(65) Prior Publication Data
US 2007/0248440 A1 Oct. 25, 2007

Related U.S. Application Data

(63) Continuation-in-part of application No. 11/063,683, filed on Feb. 23, 2005, now abandoned, which is a continuation-in-part of application No. 10/743,577, filed on Dec. 22, 2003, now Pat. No. 7,841,823.

(51) Int. Cl.
*B65G 67/00* (2006.01)

(52) U.S. Cl.
USPC .......................................................... 414/401

(58) Field of Classification Search
USPC .......... 414/354, 360, 367, 372, 396, 401, 584
See application file for complete search history.

(56) References Cited

U.S. PATENT DOCUMENTS

| 1,778,852 | A | 10/1930 | Fitch |
| 2,017,392 | A | 10/1935 | Blake |

(Continued)

FOREIGN PATENT DOCUMENTS

| CH | 383789 | 10/1964 |
| DE | 2239483 | 2/1974 |

(Continued)

OTHER PUBLICATIONS

The International Bureau of WIPO, "International Preliminary Report on Patentability," Issued in connection with international application No. PCT/US2004/042558, issued Jun. 26, 2006, 8 pages.

(Continued)

*Primary Examiner* — Saul Rodriguez
*Assistant Examiner* — Glenn Myers
(74) *Attorney, Agent, or Firm* — Hanley, Flight & Zimmerman, LLC.

(57) ABSTRACT

To help hold a trailer bed of a truck steady at a loading dock as the truck is being loaded or unloaded of its cargo, a yieldable vehicle brace exerts a substantial, but limited, reactive force upward against the trailer's rear impact guard to resist the trailer's downward movement. In some embodiments, the brace holds the trailer bed stationary up to a certain load limit and provides the trailer bed with a controlled or dampened descent when the load exceeds that limit. In some cases, the reactive upward force exerted by the brace increases with the downward velocity of the trailer bed. The reactive force can be created by one or more pressure relief valves, hydraulic fluid passing through a flow restriction, a brake, a spring, or various combinations thereof. Some embodiments of the brace include provisions for accommodating horizontal movement of the rear impact guard.

10 Claims, 36 Drawing Sheets

(56) References Cited

U.S. PATENT DOCUMENTS

| | | | |
|---|---|---|---|
| 2,637,454 A | | 5/1953 | Rowe |
| 2,637,464 A | | 5/1953 | Vogel, Jr. |
| 3,117,800 A | | 1/1964 | Magnuson |
| 3,214,188 A | | 10/1965 | Alfieri |
| 3,235,285 A | | 2/1966 | Tenenbaum et al. |
| 3,694,724 A | | 9/1972 | Eggert, Jr. |
| 3,765,692 A | | 10/1973 | Barber et al. |
| 4,146,888 A | | 3/1979 | Grunewald et al. |
| 4,191,503 A | | 3/1980 | Neff et al. |
| 4,208,161 A | | 6/1980 | Hipp et al. |
| 4,264,259 A | | 4/1981 | Hipp |
| 4,267,748 A | | 5/1981 | Grunewald et al. |
| 4,282,621 A | | 8/1981 | Anthony et al. |
| 4,307,876 A | * | 12/1981 | Cleaves .................. 267/139 |
| 4,335,901 A | | 6/1982 | Gladish |
| 4,373,847 A | | 2/1983 | Hipp et al. |
| 4,379,354 A | | 4/1983 | Hahn et al. |
| 4,400,127 A | * | 8/1983 | Metz .................. 414/401 |
| 4,443,150 A | | 4/1984 | Hahn et al. |
| 4,472,099 A | | 9/1984 | Hahn et al. |
| 4,488,325 A | | 12/1984 | Bennett et al. |
| 4,555,211 A | * | 11/1985 | Metz .................. 414/401 |
| 4,558,886 A | | 12/1985 | Straub |
| 4,560,315 A | | 12/1985 | Hahn |
| 4,605,353 A | | 8/1986 | Hahn et al. |
| 4,634,334 A | | 1/1987 | Hahn et al. |
| 4,664,582 A | * | 5/1987 | Edmeads .................. 414/401 |
| 4,695,216 A | * | 9/1987 | Erlandsson .................. 414/401 |
| 4,759,678 A | | 7/1988 | Hageman |
| RE32,736 E | | 8/1988 | Lovell |
| 4,784,567 A | | 11/1988 | Hageman et al. |
| 4,815,918 A | | 3/1989 | Bennett et al. |
| 4,861,217 A | * | 8/1989 | Erlandsson .................. 414/401 |
| 4,915,568 A | | 4/1990 | West |
| 4,936,731 A | | 6/1990 | Noble |
| 4,938,647 A | | 7/1990 | Erlandsson |
| 4,940,371 A | | 7/1990 | Cholovich |
| 4,969,792 A | | 11/1990 | Ellis et al. |
| 4,973,213 A | * | 11/1990 | Erlandsson .................. 414/401 |
| 5,068,938 A | | 12/1991 | Roscoe |
| 5,120,181 A | * | 6/1992 | Alexander .................. 414/401 |
| 5,192,057 A | | 3/1993 | Wydra et al. |
| 5,212,846 A | | 5/1993 | Hahn |
| 5,297,921 A | | 3/1994 | Springer et al. |
| 5,340,141 A | | 8/1994 | Thorndyke |
| 5,348,437 A | * | 9/1994 | Krupke et al. .................. 414/401 |
| 5,433,578 A | | 7/1995 | Honan, Jr. |
| 5,505,575 A | * | 4/1996 | Alexander .................. 414/401 |
| 5,702,223 A | | 12/1997 | Hahn et al. |
| 5,709,286 A | | 1/1998 | Mead et al. |
| 5,845,579 A | | 12/1998 | Langley et al. |
| 5,882,167 A | | 3/1999 | Hahn et al. |
| 5,964,572 A | | 10/1999 | Hahn et al. |
| 6,065,923 A | | 5/2000 | Foster |
| 6,106,212 A | | 8/2000 | Hahn |
| 6,116,839 A | | 9/2000 | Bender et al. |
| 6,139,242 A | * | 10/2000 | Alexander .................. 414/401 |
| 6,152,486 A | | 11/2000 | Pierce |
| 6,162,005 A | * | 12/2000 | Fritz .................. 414/401 |
| 6,190,109 B1 | | 2/2001 | Bender |
| 6,199,876 B1 | | 3/2001 | Eckelberry |
| 6,203,026 B1 | | 3/2001 | Jones |
| 6,257,597 B1 | | 7/2001 | Galazin |
| 6,317,914 B1 | * | 11/2001 | Preston .................. 14/71.3 |
| 6,322,310 B1 | | 11/2001 | Bender et al. |
| 6,371,714 B1 | * | 4/2002 | Sherard et al. .................. 414/401 |
| 6,416,061 B1 | | 7/2002 | French et al. |
| 6,431,819 B1 | | 8/2002 | Hahn |
| 6,488,464 B1 | | 12/2002 | Kish |
| 6,491,143 B1 | | 12/2002 | Stenquist |
| 6,520,472 B1 | * | 2/2003 | Manich et al. .................. 248/351 |
| 6,726,432 B2 | | 4/2004 | Kish et al. |
| 7,056,077 B2 | | 6/2006 | Pedersen et al. |
| 2002/0131173 A1 | | 9/2002 | Misaka |
| 2002/0168255 A1 | | 11/2002 | Kish |
| 2003/0170097 A1 | | 9/2003 | Pedersen et al. |
| 2004/0003970 A1 | | 1/2004 | Alexander |
| 2005/0150065 A1 | | 7/2005 | Muhl et al. |
| 2006/0182559 A1 | | 8/2006 | Gleason |

FOREIGN PATENT DOCUMENTS

| | | |
|---|---|---|
| DE | 2952658 | 7/1981 |
| FR | 2075643 | 10/1971 |
| GB | 2223220 | 4/1990 |
| JP | 61114930 | 6/1986 |
| WO | 2006/091900 | 8/2006 |

OTHER PUBLICATIONS

International Bureau, "International Preliminary Report on Patentability," issued in connection with counterpart international application serial No. PCT/US2008/065643, issued Jan. 5, 2010, 9 pages.

United States Patent and Trademark Office, "Non-Final Office Action," issued in connection with U.S. Appl. No. 10/743,577, mailed Dec. 24, 2009, 12 pages.

United States Patent and Trademark Office, "Non-Final Office Action," issued in connection with U.S. Appl. No. 11/063,683, mailed Dec. 24, 2009, 13 pages.

State Intellectual Property Office, P.R. China, "First Office Action," issued in connection with Chinese application serial No. 200480041834.1, issued Feb. 12, 2010, 5 pages.

International Searching Authority, "International Search Report," issued in connection with international application serial No. PCT/US2004/042558, completed Apr. 21, 2005, 2 pages.

International Searching Authority, "Written Opinion of the International Searching Authority," issued in connection with international application serial No. PCT/US2004/042558, completed Apr. 21, 2005, 7 pages.

International Bureau, "International Preliminary Report on Patentability," issued in connection with international application serial No. PCT/US2006/006753, issued Aug. 28, 2007, 7 pages.

United States Patent and Trademark Office, "Final Office Action," issued in connection with U.S. Appl. No. 10/743,577, mailed Mar. 4, 2009, 12 pages.

United States Patent and Trademark Office, "Non-Final Office Action," issued in connection with U.S. Appl. No. 10/743,577, mailed May 29, 2008, 9 pages.

United States Patent and Trademark Office,Action, "Final Office Action," issued in connection with U.S. Appl. No. 10/743,577, mailed Sep. 12, 2007, 9 pages.

United States Patent and Trademark Office, "Non-Final Office Action," issued in connection with U.S. Appl. No. 10/743,577, mailed Dec. 20, 2006, 12 pages.

United States Patent and Trademark Office, "Restriction Requirement," issued in connection with U.S. Appl. No. 10/743,577, mailed May 4, 2006, 6 pages.

Canadian Intellectual Property Office, "Office Communication," issued in connection with Canadian application No. 2,551,550, issued Jul. 2, 2008, 2 pages.

Canadian Intellectual Property Office, "Notice of Allowance," issued in connection with Canadian application No. 2,551,550, issued May 19, 2009, 1 page.

European Patent Office, "Decision to Grant European Patent," issued in connection with European application No. 04814707.8, issued Jun. 8, 2007, 1 page.

United States Patent and Trademark Office, "Final Office Action," issued in connection with U.S. Appl. No. 11/063,683, mailed Mar. 4, 2009, 12 pages.

United States Patent and Trademark Office, "Non-Final Office Action," issued in connection with U.S. Appl. No. 11/063,683, mailed Jul. 8, 2008, 9 pages.

United States Patent and Trademark Office, "Final Office Action," issued in connection with U.S. Appl. No. 11/063,683, mailed Dec. 19, 2007, 9 pages.

United States Patent and Trademark Office, "Non-Final Office Action," issued in connection with U.S. Appl. No. 11/063,683, mailed Mar. 23, 2007, 14 pages.

(56) References Cited

OTHER PUBLICATIONS

United States Patent and Trademark Office, "Restriction Requirement," issued in connection with U.S. Appl. No. 11/063,683, mailed Dec. 14, 2006, 6 pages.
International Searching Authority, "International Search Report" issued in connection with corresponding international patent application No. PCT/US2008/065643, Mailed on Oct. 16, 2008, 4 pages.
International Searching Authority, "Written Opinion" issued in connection with corresponding international patent application No. PCT/US20081065643, Mailed on Oct. 16, 2008, pp. 8 pages.
United States Patent and Trademark Office, "Notice of Allowance," issued in connection with U.S. Appl. No. 10/743,577, mailed Jul. 23, 2010, 18 pages.
State Intellectual Property Office of China, "Notification to Grant Patent Right for Invention," issued in connection with Chinese application serial No. 200480041834.1, issued Dec. 30, 2010, 2 pages.
State Intellectual Property Office of China, "Notification to Grant Patent Right for Invention," English translation, issued in connection with Chinese application serial No. 200480041834.1, issued Dec. 30, 2010, 2 pages.
Canadian Intellectual Property Office, "Office Action," issued in connection with Canadian application serial No. 2,691,426, issued Jul. 13, 2011, 4 pages.
United States Patent and Trademark Office, "Non-Final Office Action," issued in connection with U.S. Appl. No. 11/063,683, mailed Mar. 2, 2011, 14 pages.
Rite-Hite Europe, "Trailerjack" Brochure, distributed on Jan. 1, 2000 (3 pages).
"Pepsi Minneapolis Hydraulic Lift on ICC Bar" Photographs, dated Apr. 18, 2001 (2 pages).
"Trailer Lifting Installation Mead/Westvaco," Nov. 17, 2003 (2 pages).
Joyce Dayton Corporation, "Concept Drawing" for Loading Dock System, dated Jan. 15, 1986 (1 page).
Quality Engineering Company, "Despringer System" Photographs and Drawings supplied by Allied Handling, Inc., in Spring 2000, archived on Nov. 7, 2003 (1 page).
European Patent Office, "PCT International Search Report," issued by the European Patent Office on May 3, 2005, in connection with a counterpart international application No. PCT/US2004/042558 (7 pages).
European Patent Office, "PCT Written Opinion of the International Searching Authority," issued by the European Patent Office on May 3, 2005, in connection with a counterpart foreign application No. PCT/US2004/042558 (7 pages).
European Patent Office, "PCT International Search Report," issued by the European Patent Office on Jun. 16, 2006, in connection with a counterpart international application No. PCT/US2006/006753 (6 pages).
European Patent Office, "PCT Written Opinion of the International Searching Authority," issued by the European Patent Office on Jun. 16, 2006, in connection with a counterpart foreign application No. PCT/US2006/006753 (6 pages).
The International Bureau of WIPO, "PCT International Preliminary Report on Patentability," issued by the International Bureau of WIPO on Aug. 28, 2007, in connection with a counterpart international application No. PCT/US2006/006753 (7 pages).

\* cited by examiner

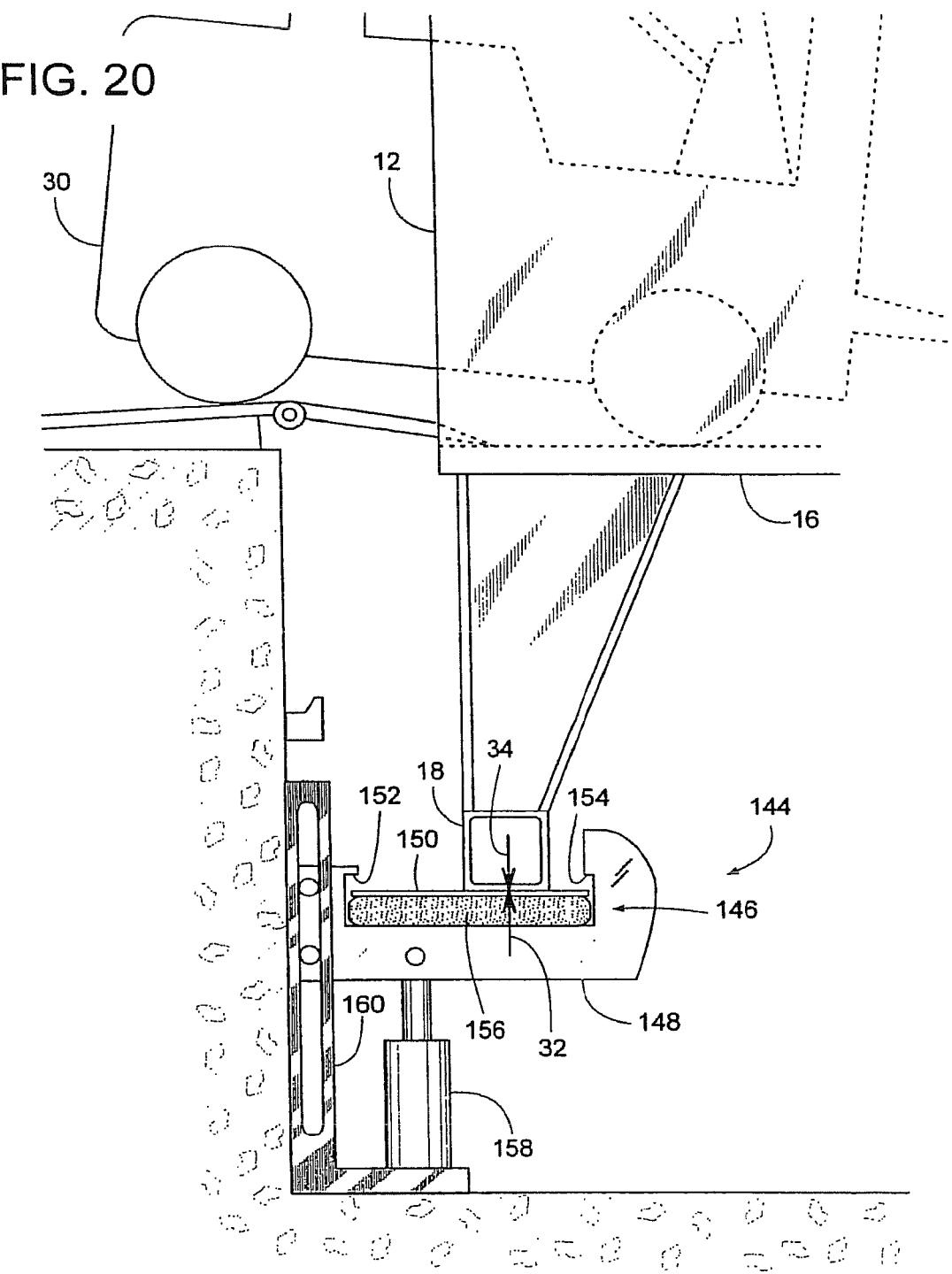

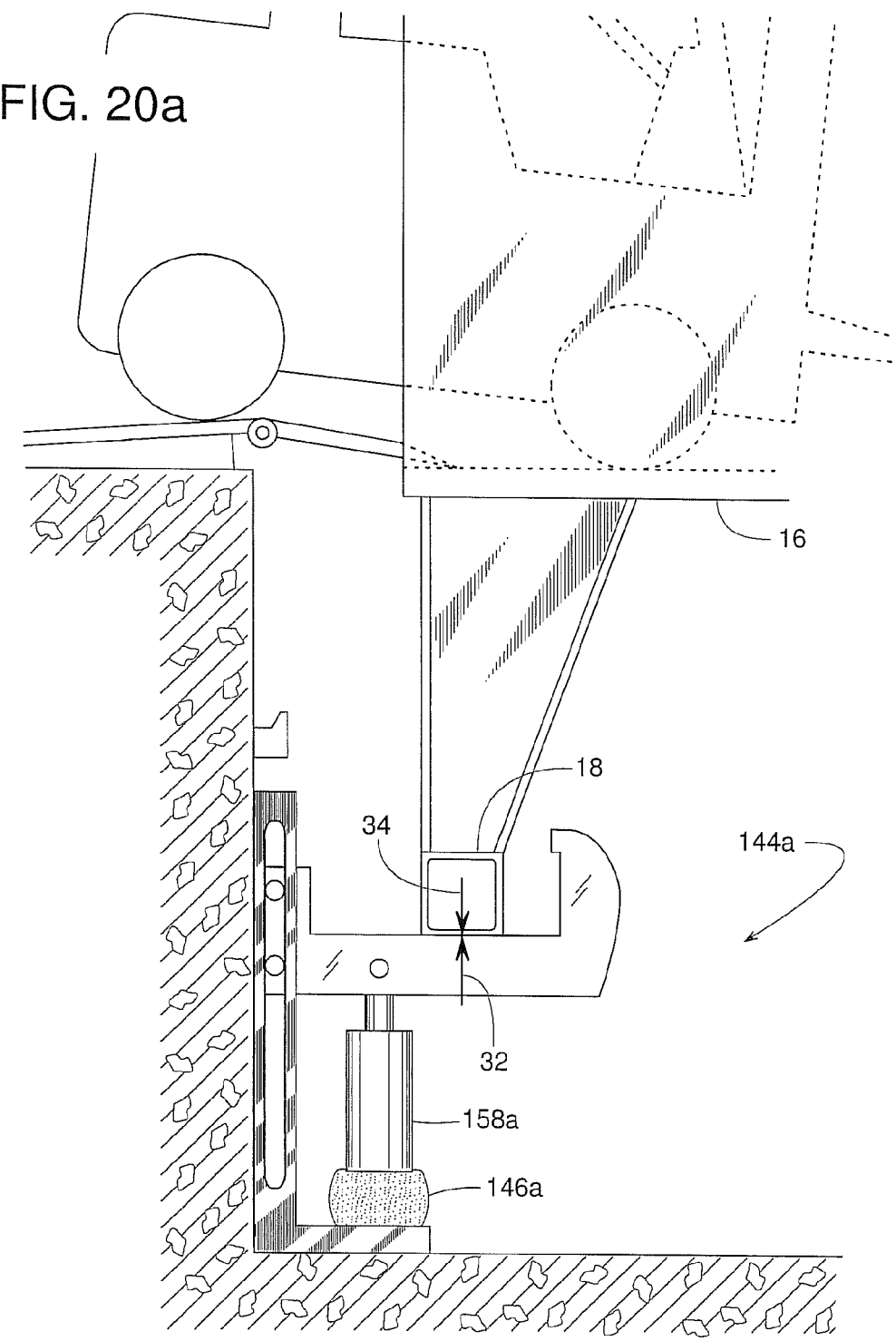

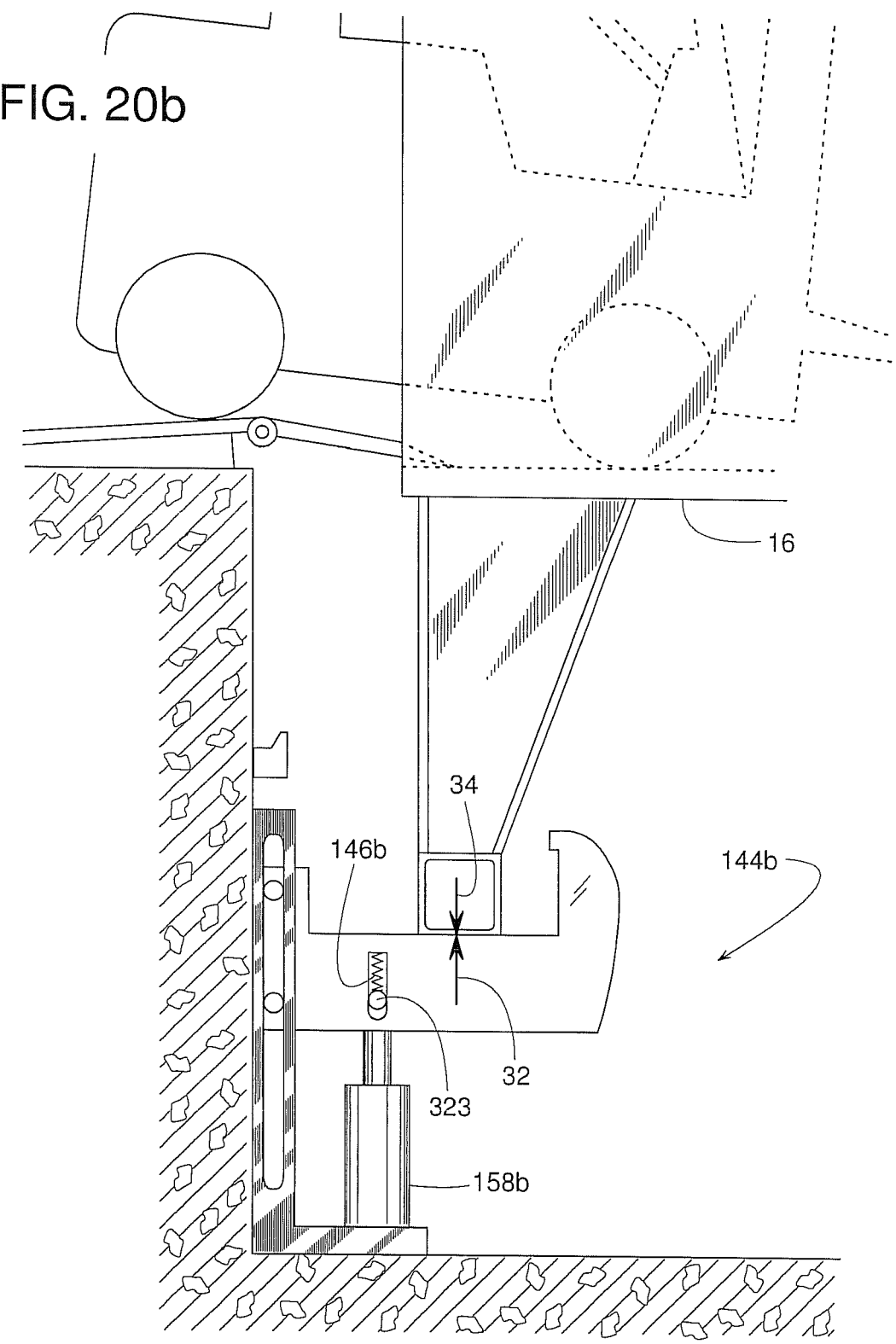

YIELDABLE BRACE FOR A VEHICLE AT A LOADING DOCK

RELATED APPLICATION

This application is a continuation-in-part of U.S. application Ser. No. 11/063,683, filed Feb. 23, 2005, now abandoned which is a continuation-in-part of U.S. application Ser. No. 10/743,577, filed Dec. 22, 2003, now U.S. Pat. No. 7,841,823, issued Nov. 30, 2010, the entire disclosures of which are incorporated herein by reference.

FIELD OF THE DISCLOSURE

The present disclosure generally pertains to service equipment at a vehicle loading dock and more specifically to a yieldable brace that helps restrain the vehicle's vertical movement as the vehicle is being loaded or unloaded of its freight.

BACKGROUND

A typical truck loading dock of a building includes an exterior doorway with an elevated platform for loading and unloading vehicles such as trucks and trailers. Many loading docks have a dock leveler to compensate for height differences between the loading dock platform and an adjacent bed of the truck or trailer. A typical dock leveler includes a deck, also known as a ramp or dockboard, which is pivotally hinged along its back edge to vary the height of its front edge. An extension plate, or lip, extends outward from the deck's front edge to span the gap between the rear of the trailer bed and the front edge of the deck. Extending from the deck's front edge, the lip rests upon the truck bed to form a bridge between the deck and the bed. This allows personnel and material handling equipment, such as a forklift truck, to readily move on and off the vehicle during loading and unloading operations.

When a forklift drives over the dock leveler and onto the trailer bed, the weight of the forklift and the cargo it may be carrying can add a significant load to the truck bed. Likewise, when the forklift exits the truck bed, weight is removed from the trailer. Thus, the load carried by the trailer changes repeatedly during the loading/unloading process. The trailer's suspension may respond to these load changes by allowing the trailer to raise and lower accordingly.

Unfortunately, the resulting vertical movement of the trailer can create some problems. For instance, the rear or side edges of the trailer usually engage some type of dock seal that is mounted at a generally fixed location along the doorway of the dock, so vertical movement of the trailer can wear out the seal. Also, a forklift suddenly descending upon entering the trailer can be disconcerting to the driver of the forklift. The problem becomes worse when the trailer has an air suspension system.

With air suspension, air-pressurized bladders support the weight of the trailer and its cargo. Air suspension systems typically include an air compressor, a holding tank, and various control valves that cooperate to add or release a controlled amount of air from the bladders to help maintain the trailer at a certain height. So, when a forklift enters the trailer, pressurized air is forced into the bladders to compensate for the forklift's added weight. Due to the suspension system's delayed response time, however, the trailer may initially sink when the forklift first enters and later rise back up toward its intended height before the forklift departs. Then, when the forklift leaves and removes its weight from the trailer, the recently added air in the bladders lifts the trailer above its designed height. The system compensates for the overshoot by then releasing some air from the bladders until the trailer settles back down to its original height. This down/up cycle of the trailer repeats itself with every load the forklift takes on or off the trailer. Compared to other suspension systems, air suspensions usually provide much greater vertical movement. And due to the mechanical linkage of typical air suspension systems, the vertical movement of the trailer is usually accompanied by a generally equal amount of horizontal movement as well.

To eliminate the repeated movement of the trailer, an air suspension system may simply dump or completely exhaust the air from the bladders before the loading or unloading process begins. This causes the trailer to descend until the suspension system bottoms out, whereby the suspension becomes inactive, and the trailer remains at its bottomed out position while the trailer is loaded or unloaded of its cargo. Although this may correct the problems associated with movement of the trailer during loading and unloading, the low position of the trailer bed can create another problem. For the dock leveler to reach such an extremely low trailer bed, the deck may need to be set at such a steep incline that it may be difficult for the forklift to travel across the deck.

Some loading docks may be provided with a vehicle restraint that helps prevent a truck or trailer from accidentally pulling away from the dock. Such vehicle restraints usually include a hook or barrier that reaches up in front of the vehicle's RIG (rear impact guard) or ICC bar. Examples of such vehicle restraints are disclosed in U.S. Pat. Nos. 6,488,464 and 6,431,819. Instead of inhibiting vertical movement of the vehicle during its loading or unloading, these patented vehicle restraints do just the opposite, they accommodate or allow the vehicle the freedom to move vertically. The '819 patent, for instance, discloses a spring that compresses with any downward force that an ICC bar may exert. Similarly, the vehicle restraint of the '464 patent includes a pressure relief valve that can be set to hold the weight of the restraint itself, but the relief valve is not meant to inhibit the downward movement of the vehicle.

Conceivably a solid, immovable support structure, such as a hydraulic jack, could be placed underneath the ICC bar to completely eliminate any vertical movement of the vehicle or actually lift the vehicle; however, such a support structure could result in an excessive upward reactive force being applied to the ICC bar and the underside of the trailer bed to which the bar is attached. More specifically, if the trailer bed were held stationary, any added weight of cargo or the weight of a forklift entering the trailer would be transmitted through the ICC bar and to the frame, neither of which may not be designed to carry such loads. Thus, holding the trailer bed completely immovable could damage the ICC bar or other parts of the trailer.

Since holding a trailer bed completely stationary can damage the vehicle, and since allowing a trailer bed complete freedom of movement (as taught in the '464 and '819 patents) does not address the problems that such movement causes, there is a need for a method or apparatus that alleviates the problems created by a vehicle moving in response to being loaded or unloaded of its cargo.

SUMMARY

In some embodiments, a vehicle brace opposes the vertical movement of a vehicle at a loading dock.

In some embodiments, a vehicle brace substantially prevents downward movement of a vehicle for up to a certain downward force exerted by the vehicle.

In some embodiments, a vehicle brace substantially prevents downward movement of a vehicle for up to a maximum allowable downward force exerted by the vehicle and permits a controlled downward movement of the vehicle when the vehicle exerts a downward force that exceeds the maximum allowable force.

In some embodiments, a vehicle brace exerts an upward reactive force against a vehicle, wherein the upward reactive force increases with the downward velocity of the vehicle.

In some embodiments, a vehicle brace exerts an upward reactive force against a vehicle, wherein the reactive force's vertical component is greater than its horizontal component.

In some embodiments, a vehicle brace includes a pressure relief valve that enables the vehicle brace to prevent downward movement of a vehicle for up to a certain downward force exerted by the vehicle.

In some embodiments, a vehicle brace includes a pressure relief valve that enables the vehicle brace to prevent downward movement of a vehicle for up to a maximum allowable downward force exerted by the vehicle and to permit a controlled downward movement of the vehicle when the vehicle exerts a downward force that exceeds the maximum allowable.

In some embodiments, a vehicle brace includes a flow restrictor that enables the vehicle brace to exert an upward reactive force against a vehicle, wherein the reactive force increases with the downward velocity of the vehicle.

In some embodiments, a vehicle brace includes a flow restrictor and a bypass valve that enable the vehicle brace to move more freely upward than downward.

In some embodiments, a vehicle brace is responsive to a sensor that determines whether a forklift or other body is about to enter the vehicle.

In some embodiments, a vehicle brace includes a brake that enables the vehicle brace to opposes the vertical movement of a vehicle at a loading dock.

In some embodiments, a vehicle brace includes a spring that enables the vehicle brace to opposes the vertical movement of a vehicle at a loading dock.

In some embodiments, a vehicle brace engages a vehicles rear impact guard to oppose the vertical movement of the vehicle at a loading dock.

In some embodiments, a vehicle brace for exerting an upward reactive force against a vehicle is combined with a vehicle restraint that helps prevent the vehicle from accidentally pulling away from a loading dock.

In some embodiments, a vehicle brace includes a release mechanism that enables the brace to react quickly in response to a sudden upward movement of a vehicle's rear edge. In some cases, the quick reactive movement of the brace is made possible by allowing the brace to move without necessarily having to displace hydraulic fluid, which could otherwise dampen or slow the brace's movement.

In some embodiments, the release mechanism includes a sliding connection between a hydraulic cylinder and the brace's support member.

In some embodiments, a vehicle brace includes a release mechanism that enables the brace's support member to descend quickly as a vehicle backing into the dock rapidly forces the support member down from a raised, stored position to a preparatory position. In some cases, the quick downward movement of the support member is accomplished by allowing the brace to descend without necessarily having to displace hydraulic fluid that could otherwise dampen or slow the brace's descent.

In some embodiments, a vehicle brace comprises a support member and a vehicle-restraining member, wherein the support member helps restrain vertical movement of the vehicle's ICC bar, and the vehicle-restraining member helps limit the forward movement of the vehicle. In some cases, both the support member and the vehicle-restraining member are locked in a vehicle-restraining position to help prevent someone from stealing the vehicle or its trailer by manually forcing the support member or the vehicle-restraining member away from the ICC bar.

In some embodiments, to prevent thieves from defeating the locking feature of a vehicle brace, a metal shield can be installed adjacent to or incorporated with flexible hydraulic hoses that lead to the brace's support member and the vehicle-restraining member, whereby the shield help protect the hoses from being cut.

BRIEF DESCRIPTION OF THE DRAWINGS

FIG. 20 is a side view similar to FIG. 19 but showing the brace raised and showing a dock leveler in its operative position.

FIG. 20a is a side view similar to FIG. 19a but showing the brace raised and showing a dock leveler in its operative position.

FIG. 20b is a side view similar to FIG. 19b but showing the brace raised and showing a dock leveler in its operative position.

DETAILED DESCRIPTION

For a truck, trailer, or other vehicle parked at a loading dock, various embodiments of vehicle braces can be used to help hold the rear edge of the vehicle steady (particularly in the vertical direction) as the vehicle is being loaded or unloaded of its cargo. Although various vehicle braces will be described, each of the braces includes a support member that is movable to a preparatory position where the support member can provide an upward reactive force against the vehicle in reaction to a downward force exerted by the vehicle against the support member. In some embodiments a control system moves the support member to its preparatory position, and in other cases, it is the vehicle itself that moves the support member into position.

Once in the preparatory position, the magnitude of the reactive force exerted by the support member upward against the vehicle can depend on the particular embodiment of the vehicle brace. In some cases, the reactive force is substantially equal and opposite that of the downward force exerted by the vehicle against the support member, whereby the vehicle is held substantially stationary provided the downward force is no greater than a certain limit. When operating beyond that limit, in some cases the support member provides a generally constant reactive force that opposes but is less than the downward force exerted by the vehicle, and in other cases, the reactive force increases with an increase in the downward force or the downward velocity of the vehicle. In either case, the reactive force slows the descent of the vehicle, regardless of whether the reactive force is constant or variable.

Biased-Up, Single Reaction

Figure 1:
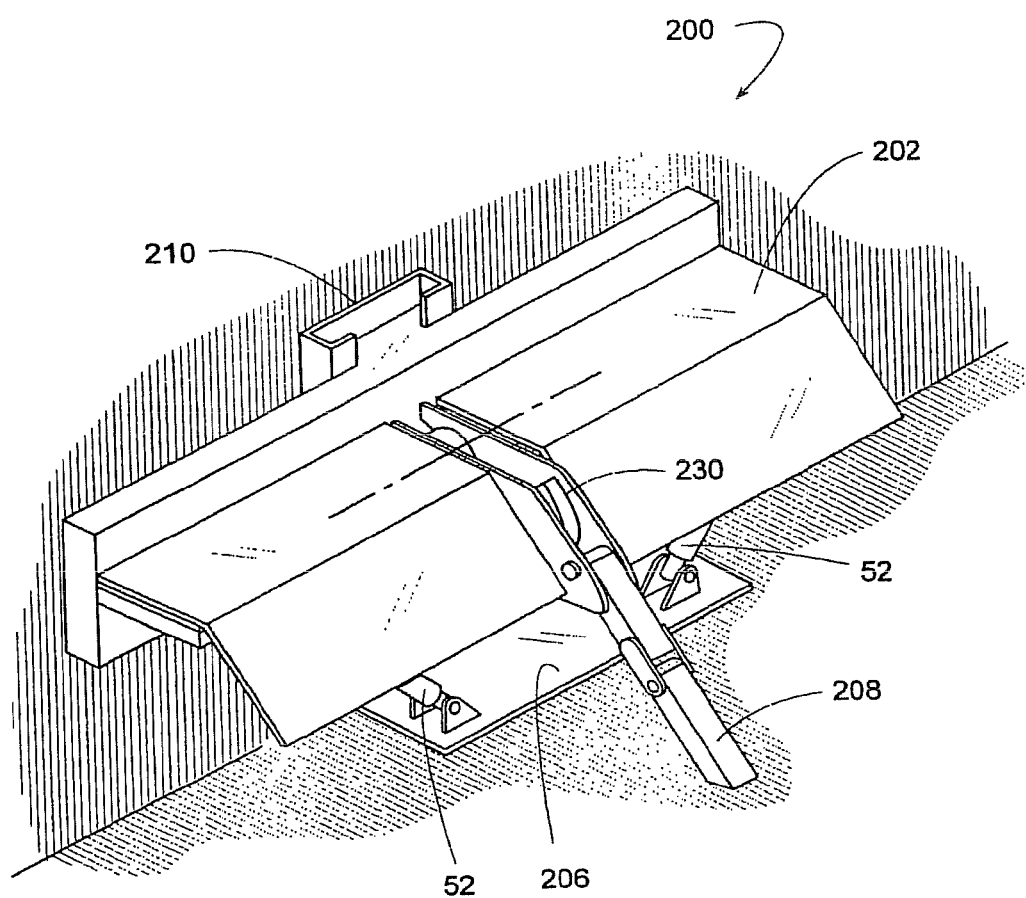
FIG. 1 is a perspective view of one embodiment of a vehicle brace installed at a loading dock.
Figure 2:
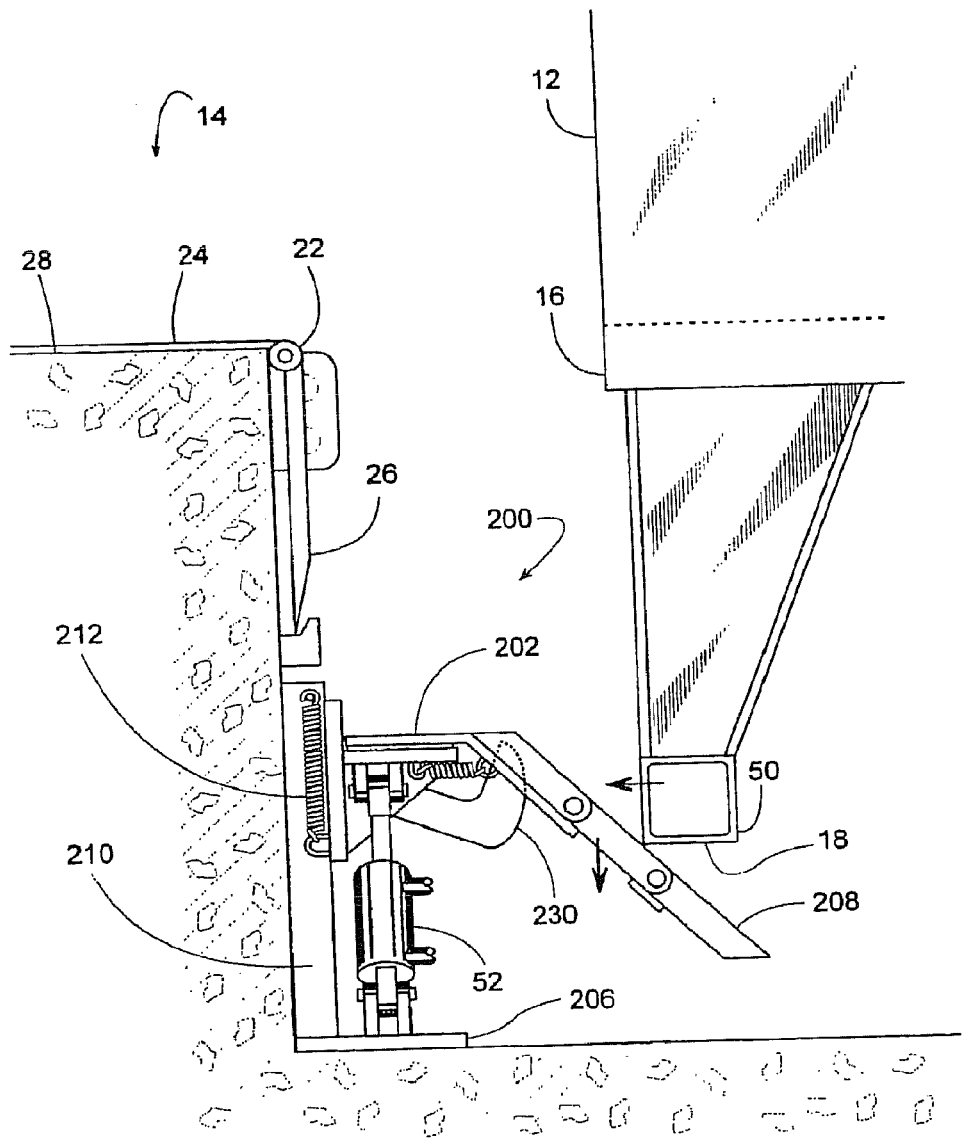
FIG. 2 is a side view of the vehicle brace of FIG. 1, wherein a vehicle is shown backing into the brace to move the brace's support member to a preparatory position.
Figure 3:
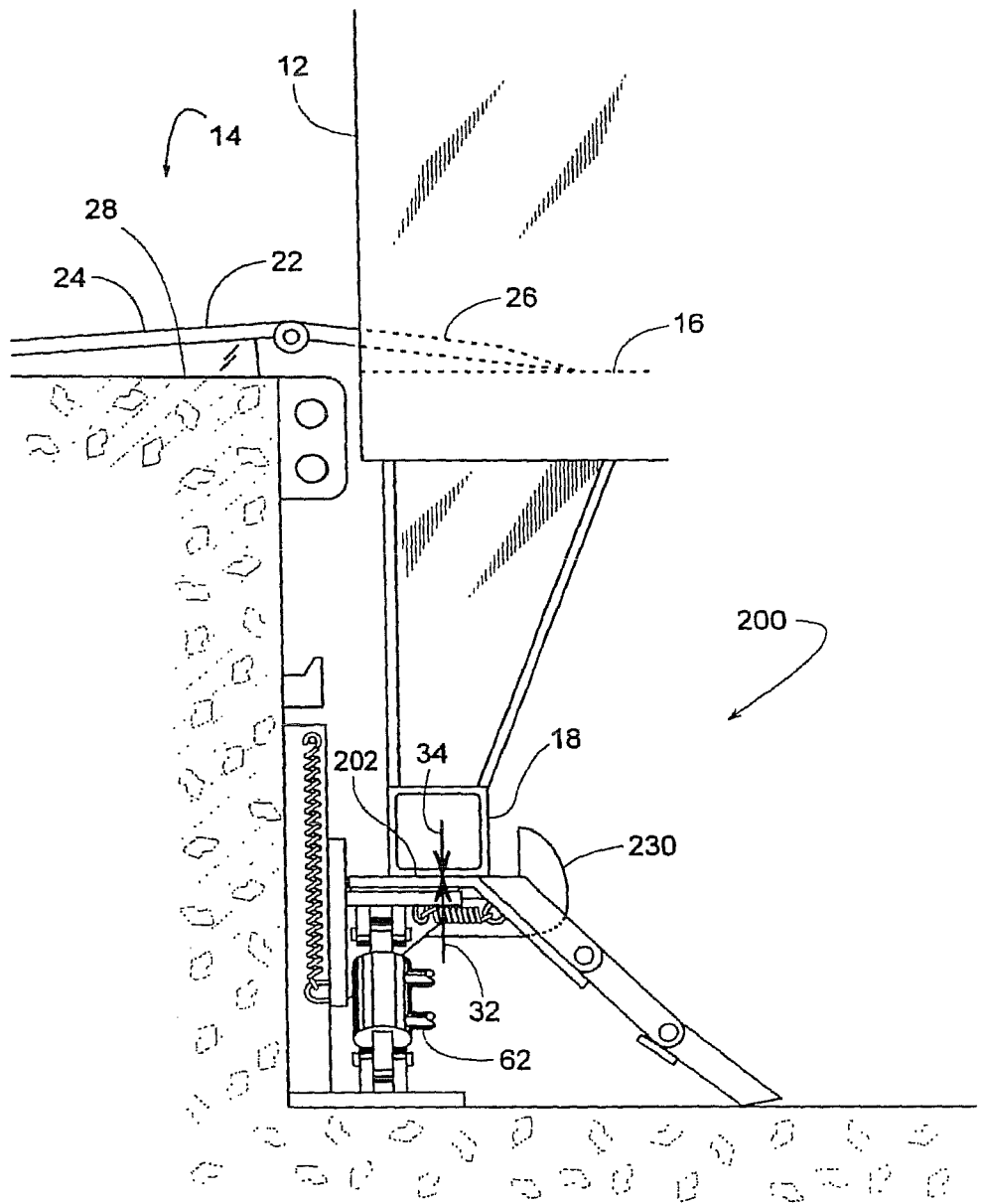
FIG. 3 is a side view similar to FIG. 2 but showing the brace's support member at a preparatory position and showing a dock leveler's lip extended into the rear of a vehicle.
Figure 4:
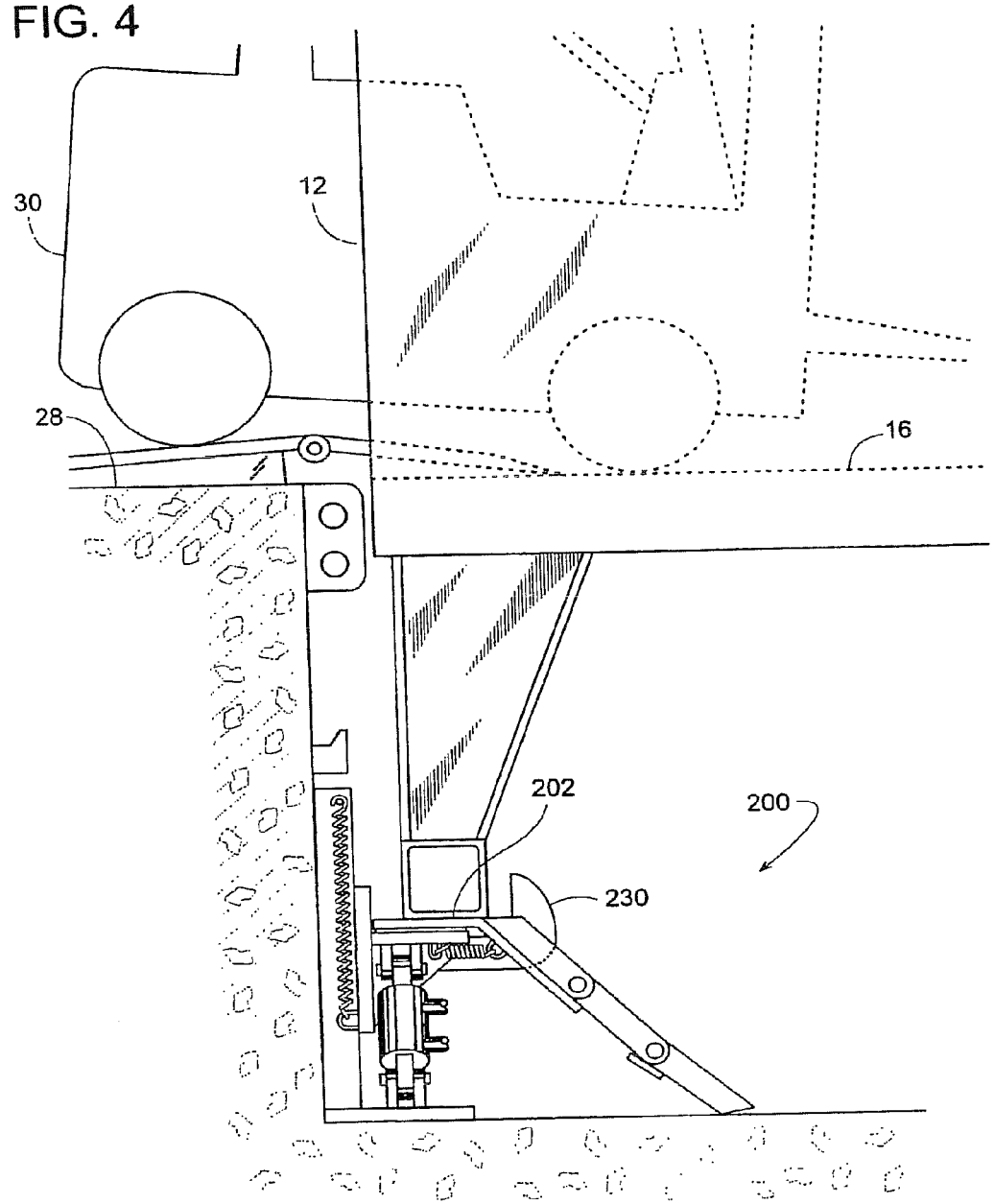
FIG. 4 is similar to FIG. 3 but showing a forklift traveling over the dock leveler to enter or exit the vehicle's trailer bed.
Figure 5:
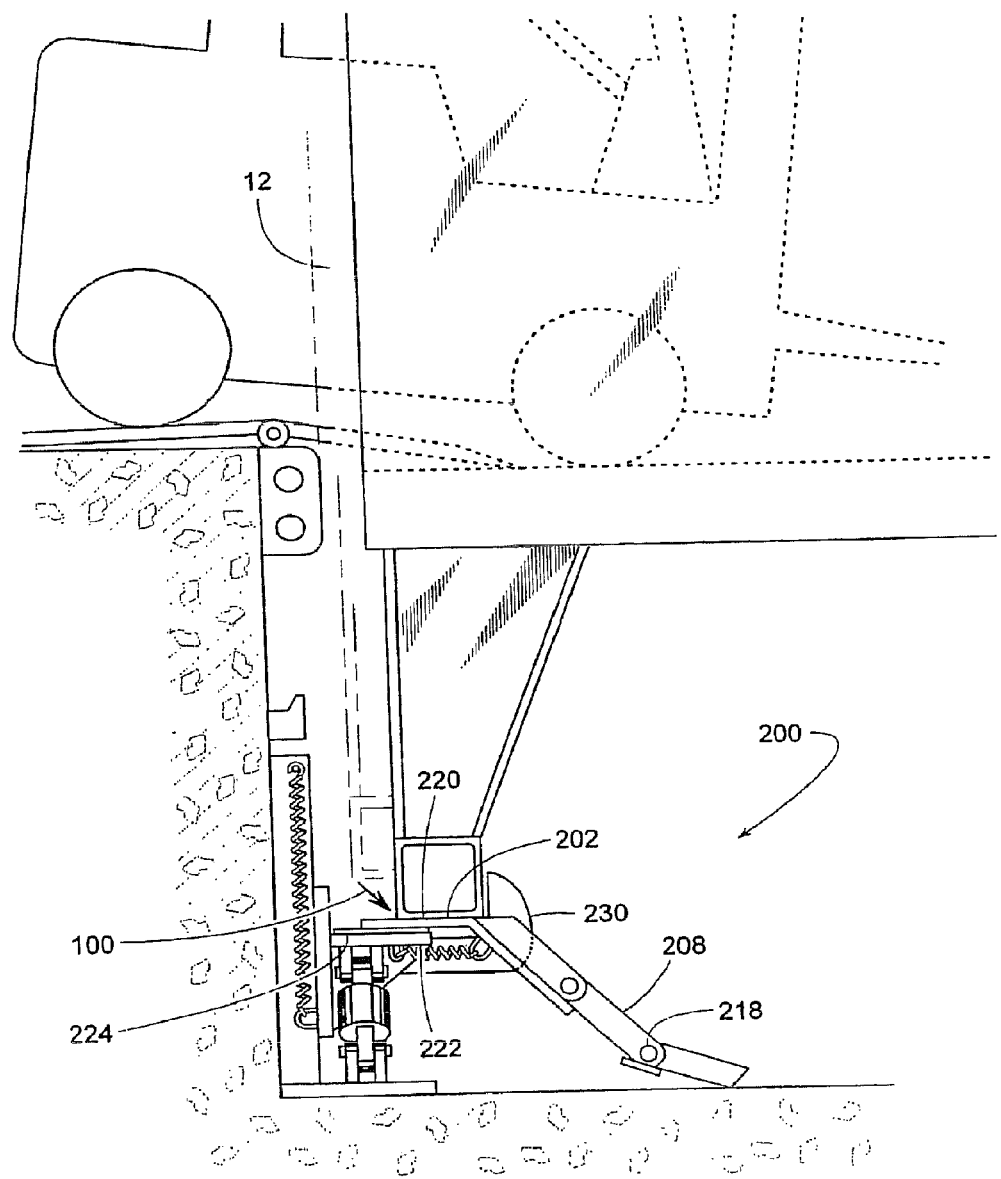
FIG. 5 is similar to FIG. 4 but showing how the weight of the forklift forces the vehicle downward.
Figure 6:
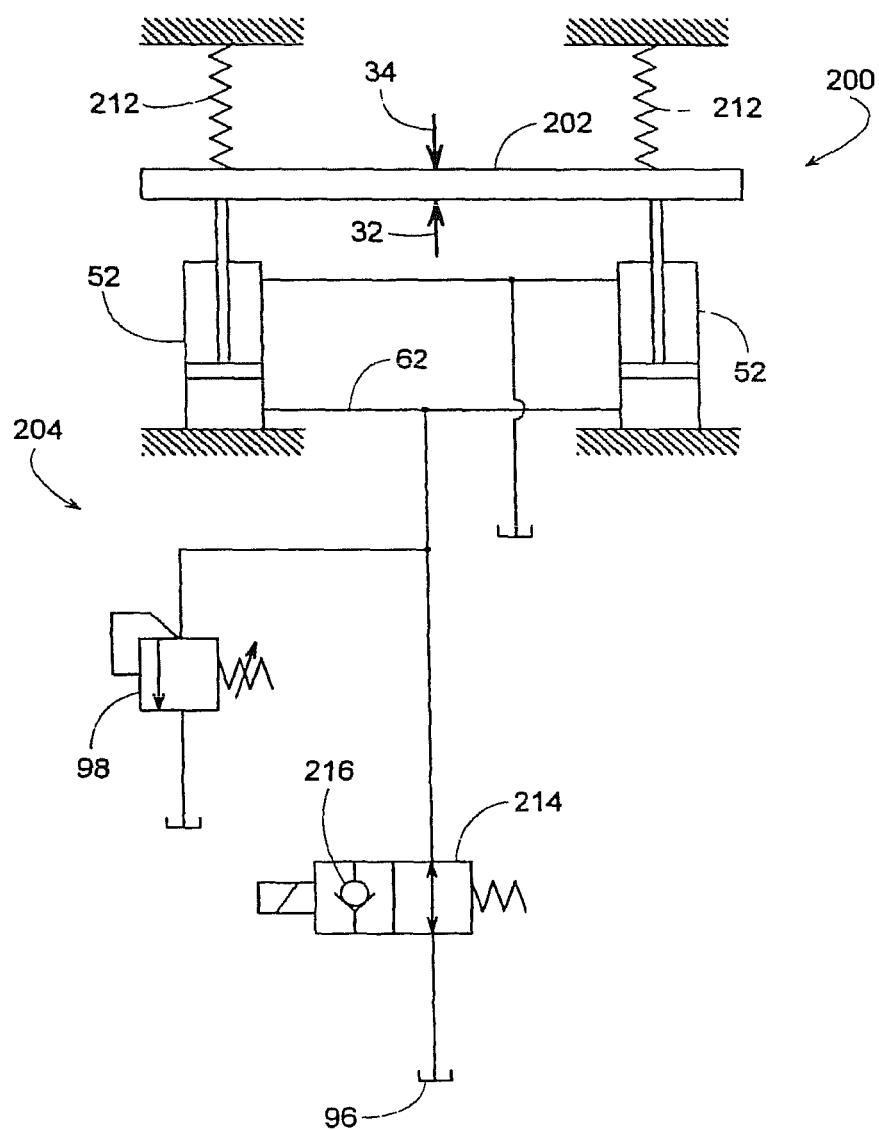
FIG. 6 is a schematic diagram of a hydraulic circuit that can control the vehicle brace of FIG. 1.

The first embodiment of a vehicle brace 200 for steadying a vehicle 12 at a loading dock is shown in FIGS. 1-6. FIG. 1 is a perspective view, FIG. 6 is a schematic view, and FIGS. 2-5 are side views of vehicle brace 200 under various operating conditions. The term, "vehicle" represents any wheeled cargo carrier including, but not limited to, a truck or trailer. To help restrict downward movement of vehicle 12, a support member 202 of brace 200 is shown in FIGS. 3-5 engaging the vehicle's rear edge, which actually encompasses any part of vehicle 12 including, but not limited to, a lower back surface of a trailer bed 16 or a rear impact guard such as an ICC bar 18.

For brace 200, it is the movement of vehicle 12 backing into dock 14 that moves support member 202 from its raised, stored position of FIG. 2 to a preparatory position of FIG. 3. Once in the preparatory position, a control system 204 of FIG. 6 enables support member 202 to exert a reactive force 32 that is equal and opposite to a downward force 34 exerted by vehicle 12 so that support member 202 remains substantially stationary at its preparatory position until force 34 exceeds a predetermined maximum allowable force. If force 34 exceeds the maximum allowable force, then the downward force 34 overcomes reactive force 32, which causes brace 200 to yield by allowing support member 202 to descend. While descending, support member 202 may still exert a generally constant reactive force 32 that, although it is less than downward force 34, is sufficient to appreciably or noticeably slow the descent of support member 202 and the portion of vehicle 12 resting thereon. Below the maximum allowable force, support member 202 of brace 200 helps hold the rear end of vehicle 12 at a generally fixed height, and above the maximum allowable force, brace 200 yields to slow the descent of vehicle 12 and prevent reactive force 32 from bending or otherwise damaging bar 18 or other parts of vehicle 12.

In some embodiments of brace 200, vehicle brace 200 comprises a base plate 206 anchored to the floor of loading dock 14, an articulated guide 208 attached to support member 202, and a track 210 attached to a vertical wall of loading dock 14 for guiding the movement of support member 202. To enable support member 202 to exert reactive force 32, the control system 204 of brace 200 includes one or more piston/cylinders 52 that have an upper end coupled to support member 202 and a lower end connected to base plate 206. A tension spring 212 urges support member 202 up toward its stored position of FIGS. 1 and 2.

Referring to FIG. 2, operation may begin with vehicle 12 backing into dock 14. As vehicle 12 travels back, bar 18, or some other surface of vehicle 12, engages guide 208, which provides a wedge or cam action that pushes support member 202 down in opposition to the urging of spring 212 until bar 18 rides over the top of support member 202. As vehicle 12 pushes support member 202 down to its preparatory position, piston/cylinders 52 are free to retract because a de-energized solenoid valve 214 of FIG. 6 vents the piston side of the cylinders to a tank 96.

Next, FIG. 3 shows bar 18 atop support member 202, and a dock leveler 22 is shown with its ramp 24 raised and its lip 26 extended to provide a bridge from a platform 28 of dock 14 to a trailer bed 16 of vehicle 12. This creates a path for a forklift 30 and other material handling equipment to move cargo between vehicle 12 and platform 28 as shown in FIG. 4.

To help hold the rear end of vehicle 12 steady as forklift 30 moves on and off of trailer bed 16, solenoid valve 214 of FIG. 6 is energized. This places a check valve 216 between a tank 96 and the piston side of cylinders 52. When forklift 30 or other weight urges vehicle down, check valve 216 prevents support member 202 from descending; however, check 216 allows support member 202 to follow any upward movement of vehicle 12.

If excessive weight added to trailer bed 16 creates a force 34 that exceeds the predetermined maximum allowable force, then a pressure relief valve 98 opens to release excess pressure in line 62 to tank 96. This limits the pressure in line 62 to create a maximum allowable reactive force 32 that slows the descent of vehicle 12. Thus, support member 202 prevents vehicle 12 from descending up to the maximum allowable force limit. Beyond the maximum allowable limit, brace 200 yields, but support member 202 still exerts a generally constant upward reactive force 32 that slows the descent of vehicle 12.

As vehicle 12 descends, in some cases, the vehicle may also moves horizontally due to the design of the vehicle's suspension system. The vehicle's vertical and horizontal movement is depicted by arrow 100 of FIG. 5. In some cases, guide 208 may include a pivotal joint 218 that prevents the downward movement of vehicle 12 from bending or crushing guide 208. To accommodate the horizontal movement of vehicle 12, support member 202 may comprise an upper weight-bearing member 220, a lower weight-bearing member 222, and an anti-friction element 224 therebetween. Upper member 220 is installed to slide horizontally relative to lower member 222, and element 224 minimizes the friction between members 220 and 222. The reduced friction helps prevent vehicle 12 from dragging bar 18 across upper member 220, which thus helps prevent damaging wear or bending forces from developing between bar 18 and upper member 220. When vehicle 12 moves toward bumper 236 or completely departs dock 14, a spring 238 can urge upper member 220 back to its starting position directly above lower member 222.

To help prevent vehicle 12 from accidentally or prematurely pulling away from dock 14, vehicle brace 200 can be provided with a fixed or movable hook 230 (e.g., pivotal) or some other type of vehicle restraining member. Hook 230, for example, can be selectively driven between a retracted position, as shown in FIGS. 1 and 2, and a vehicle-restraining position as shown in FIGS. 3-5. Further structural and functional details of hook 230 as well as guide 208 can be found in U.S. Pat. No. 6,116,839, which is specifically incorporated by reference herein.

Powered-Up, Single Reaction

As an alternative to having springs 212 raise support member 202, FIGS. 7-13 show a vehicle brace 10 with a support member 20 that is powered up. With brace 10, a control system 36 of FIG. 13 can raise support member 20 from its stored position of FIG. 7 to its operative position of FIG. 8.

Figure 7:
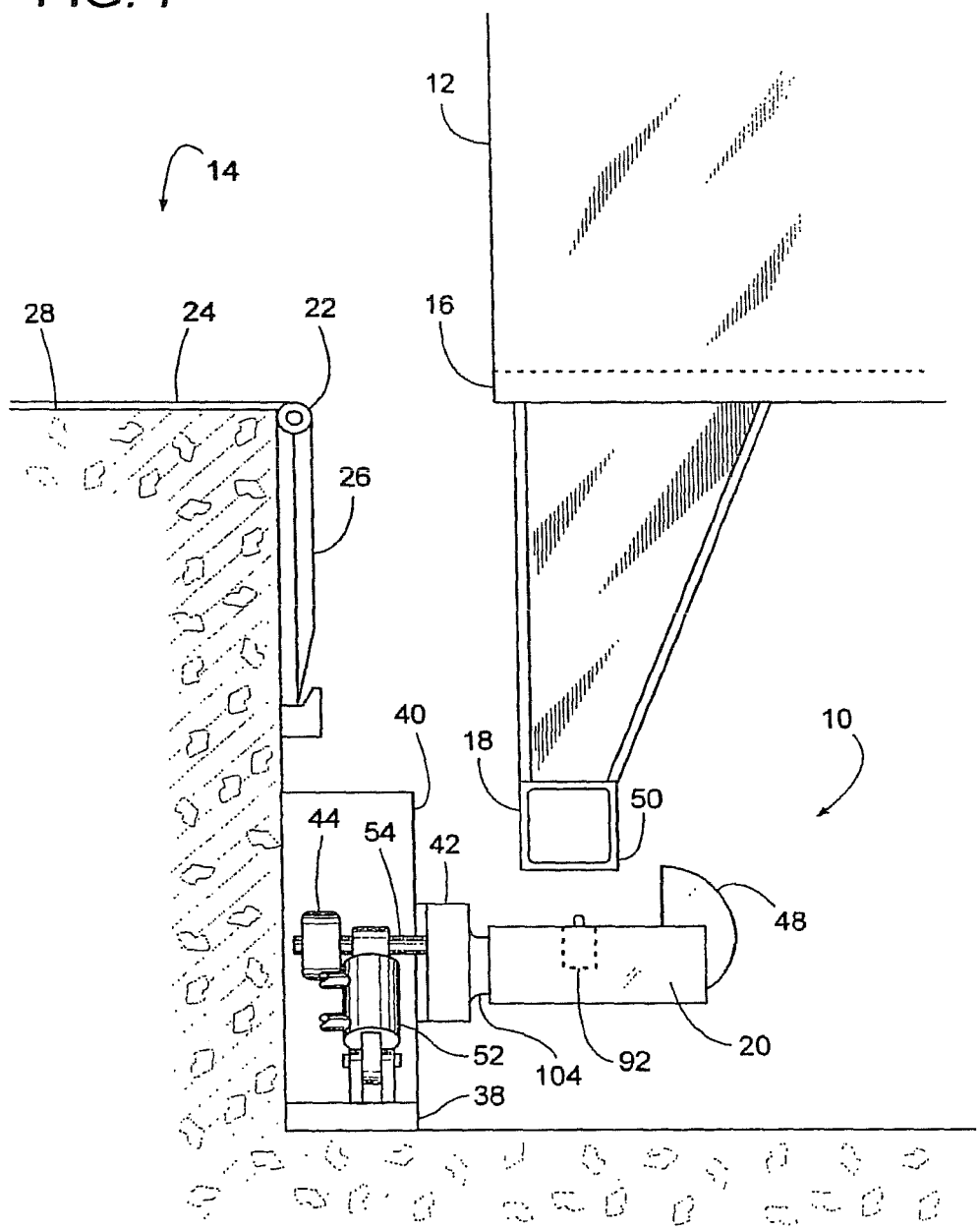
FIG. 7 a side view of another vehicle brace and showing a vehicle having backed its rear impact guard over a support member of the brace.

The stored position allows vehicle 12 to back into dock 14, so bar 18 can be positioned over vertical support member 20 as shown in FIG. 7.

Figure 8:
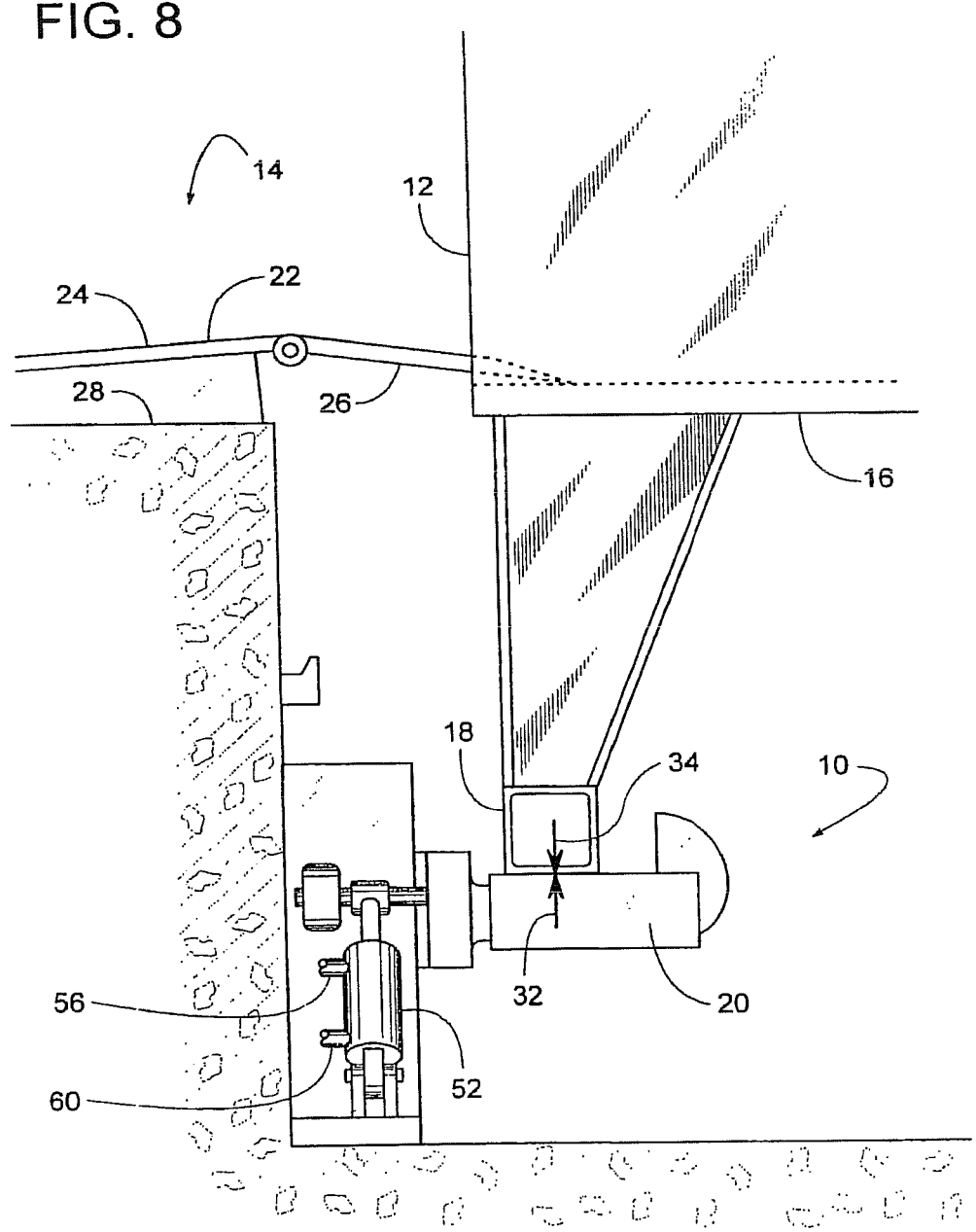
FIG. 8 is a side view of the vehicle brace of FIG. 7 but showing the brace in a preparatory position.

After vehicle 12 backs into dock 14, dock leveler 22 raises its ramp 24 and extends its lip 26 to provide a bridge from platform 28 of dock 14 to trailer bed 16 of vehicle 12 as shown in FIG. 8. It should be noted that the sequence of raising support member 20 and placing lip 26 on trailer bed 16 could be reversed.

Vehicle brace 10 comprises a base plate 38 and a track 40 that are attached to dock 14. A carriage 42 is mounted for vertical travel along track 40. In some cases, rollers 44 can help reduce friction between carriage 42 and track 40. Carriage 42 may include flanges 46 that help prevent the carriage from being pulled horizontally out from within track 40. Carriage 42 provides structure for supporting one or more vertical support members 20 and an optional hook 48. Hook 48 represents any structure that can engage a front edge 50 of bar 18 to help prevent vehicle 12 from accidentally pulling away from dock 14.

In the illustrated embodiment, hook 48 is fixed relative to carriage 42. To obstruct or release bar 18, carriage 42 respectively rises and descends to move hook 48 accordingly. In other embodiments, however, hook 48 can pivot or otherwise move relative to carriage 42, so hook 48 can selectively obstruct or release bar 18 without carriage 42 necessarily having to move along track 40.

To move carriage 42, one or more hydraulic cylinders 52 (a piston/cylinder) are installed between carriage 42 and base 38. Cylinders 52 actually represent any actuator capable of moving carriage 42 up or down. Such an actuator could conceivably be installed in any appropriate orientation or configuration and function under any suitable principle of operation. Examples of such an actuator include, but are not limited to, a gas filled piston/cylinder, a liquid filled piston/cylinder, rodless cylinder, spring-return piston/cylinder, vehicle-operated actuator, linear motor, chain and sprocket, rack and pinion, winch, electric motor, hydraulic motor, air powered motor, pressurized fluid filled bladder, spring, etc.

For the illustrated embodiment, cylinders 52 have a lower end pinned to base plate 38 and have an upper end pinned to a shaft 54. Shaft 54 can be an axle for a roller, as shown, or can be a separate item for just cylinders 52. Cylinders 52 extend to raise carriage 42, which raises hook 48 and vertical support members 20. Control system 36 of FIG. 13 can be used to control the operation of cylinders 52.

Each cylinder 52 has one port 56 connected to a hydraulic line 58 of system 36 and a second port 60 connected to a line 62. The hydraulic pressure in lines 58 and 62 determine the action of cylinders 52. A hydraulic pump 64 provides system 36 with hydraulic pressure in a conventional manner. Pump 64, for instance, can be cycled on and off as needed, or the pump can be associated with an appropriate system relief valve, and/or pump 64 could be a variable capacity pump. Regardless, pump 64 supplies pressurized hydraulic fluid at a discharge line 68.

To lift support member 20 to its operative position up against bar 18, a two-position four-way valve 86 is de-energized to convey the pressure in line 68 to line 62 and the piston side of cylinders 52. Support member 20 rises until it raises a limit switch 92 up against bar 18, which de-energizes pump 64. A relief valve 82 is set to maintain sufficient pressure in line 68 for supporting the weight of carriage 42 and support member 20. A check valve 232 prevents support member 20 from being readily pushed back down. However, if force 34 reaches a predetermined maximum allowable limit, a second pressure relief valve 98, which is set at a much higher pressure than relief valve 82, releases the excess pressure in line 62 to tank 96. Thus, support member 20 prevents vehicle 12 from descending up to the maximum allowable force. Beyond the maximum allowable limit, brace 10 yields, but support member 20 still exerts a generally constant upward reactive force 32 (determined by pressure relief valve 98) that slows the descent of vehicle 12.

In some cases, particularly with air suspension systems, trailer bed 16 will move about one inch horizontally away from dock 14 for every one inch of downward movement. This movement is depicted by arrow 100 of FIG. 10. To accommodate the horizontal movement, each vertical support member 20 may comprise a spring-loaded sleeve 102 that slides over a support beam 104. As bar 18 moves horizontally away from dock 14, bar 18 forces sleeve 102 to move along with it, thereby minimizing wear between bar 18 and support member 20 and perhaps avoid bending of bar 18. Installing a wear pad, linear bearing, or other anti-friction member between sleeve 102 and support beam 104 can reduce wear between sleeve 102 and support beam 104. When bar 18 lifts away from support member 20 or when bar 18 moves toward carriage 42, a spring 106 draws sleeve 102 back over support beam 104.

Vehicle Brace with Load Sensor

An advantage of vehicle braces 10 and 200, when controlled as just described, is that braces 10 and 200 each help hold vehicle 12 substantially still over a broad range of forces 34. Force 34, however, may accumulate gradually as forklift 30 continues to deliver cargo into vehicle 12, so eventually the accumulated weight of the cargo may exceed the maximum allowable force 34, which can cause support member 20 to descend significantly in response to just a small incremental load being placed in vehicle 12. To address this concern, it may be desirable, in some cases, to have a vehicle brace that controllably yields to incremental loads as they occur or shortly thereafter.

Figure 9:
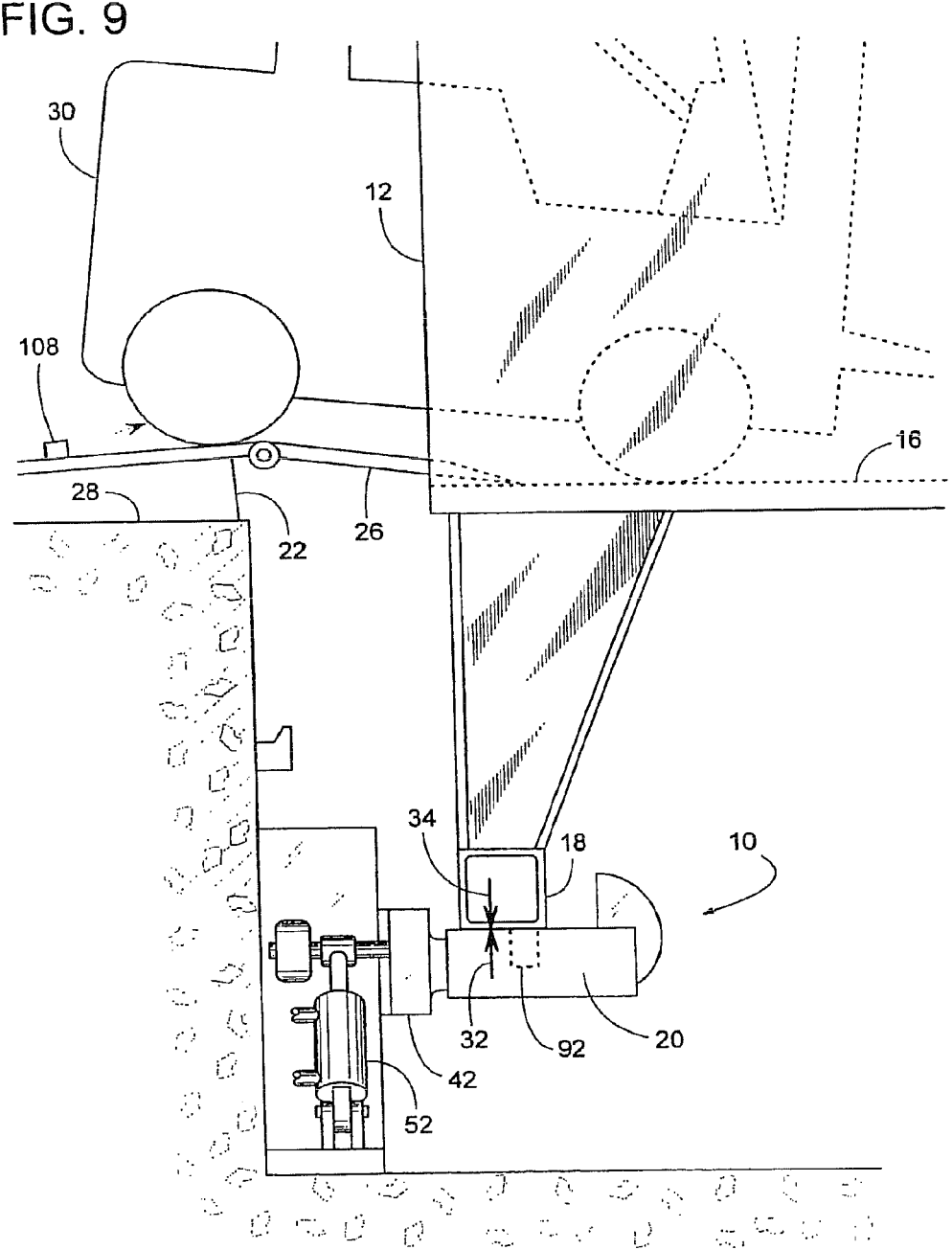
FIG. 9 is a side view similar to FIG. 8 but showing a forklift traveling over a dock leveler to enter or exit the vehicle's trailer bed.
Figure 10:
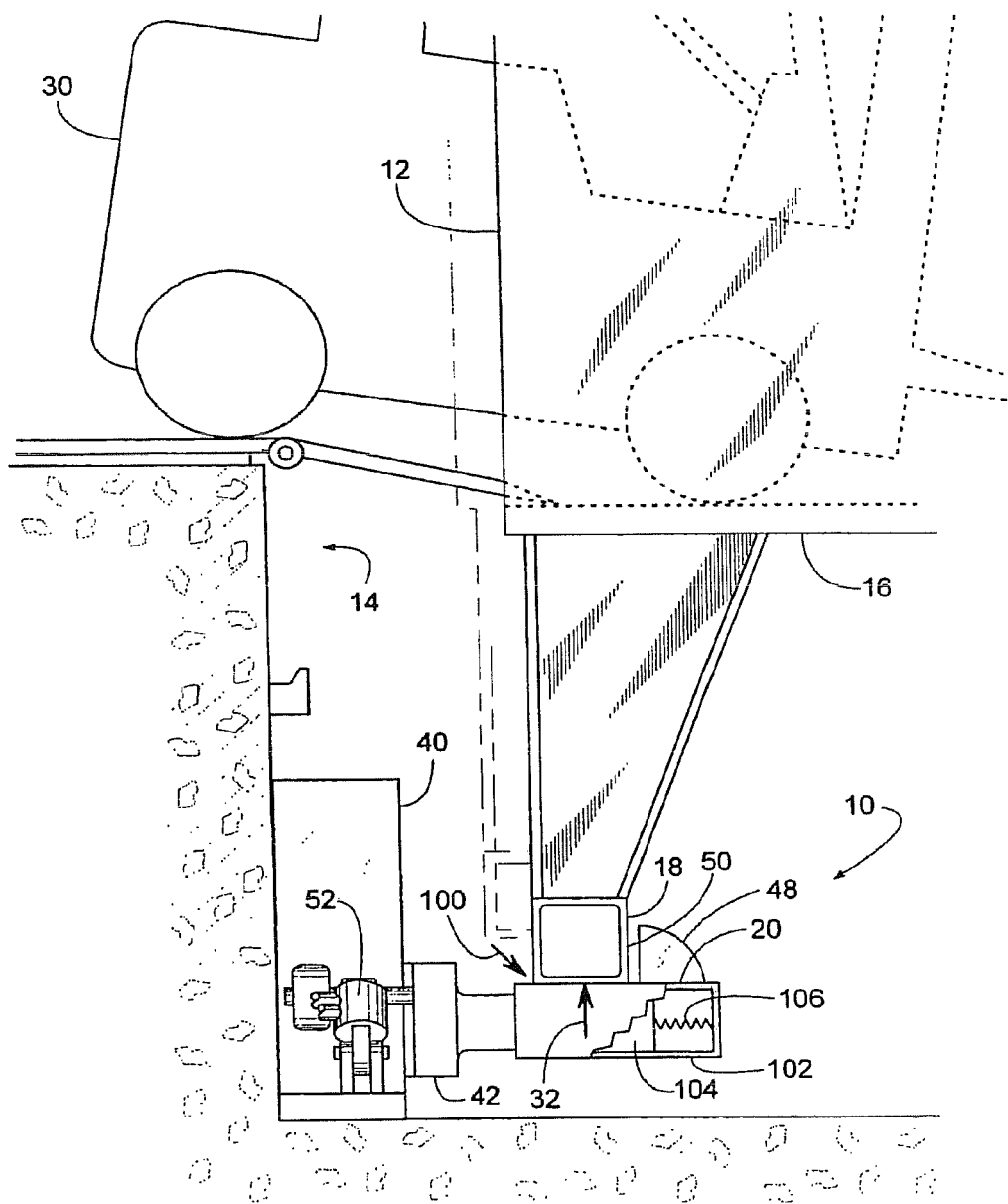
FIG. 10 is a side view similar to FIG. 9, but the figure also shows a partial cutaway of the brace's support member to illustrate how the brace responds to movement of the trailer bed.
Figure 11:
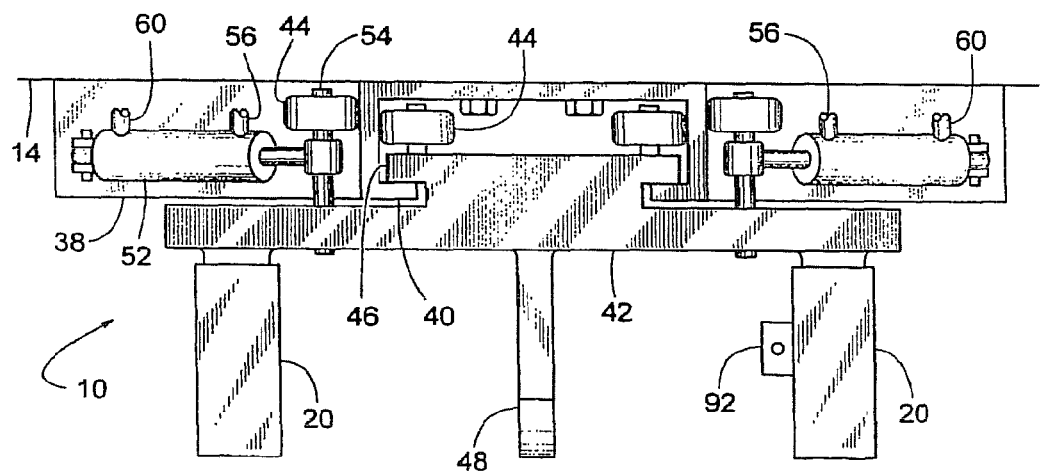
FIG. 11 is a top view of the vehicle brace of FIG. 7.
Figure 12:
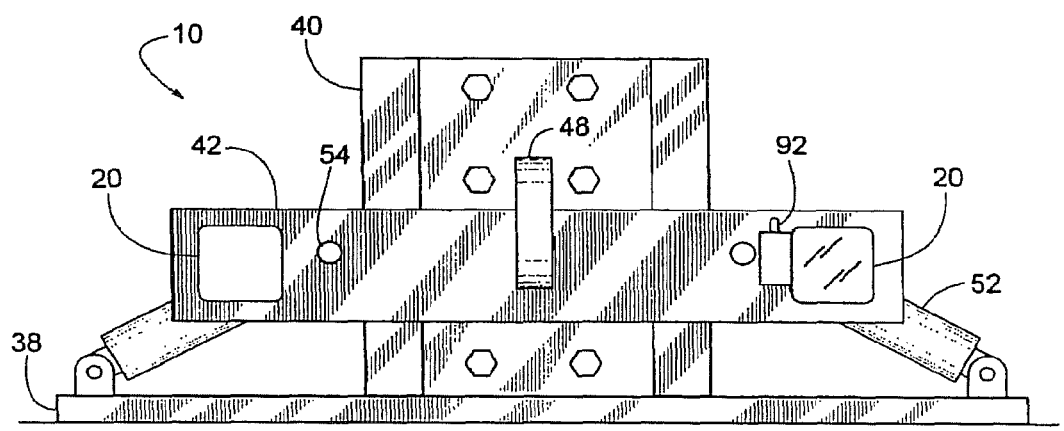
FIG. 12 is a front view of the vehicle brace of FIG. 7.
Figure 13:
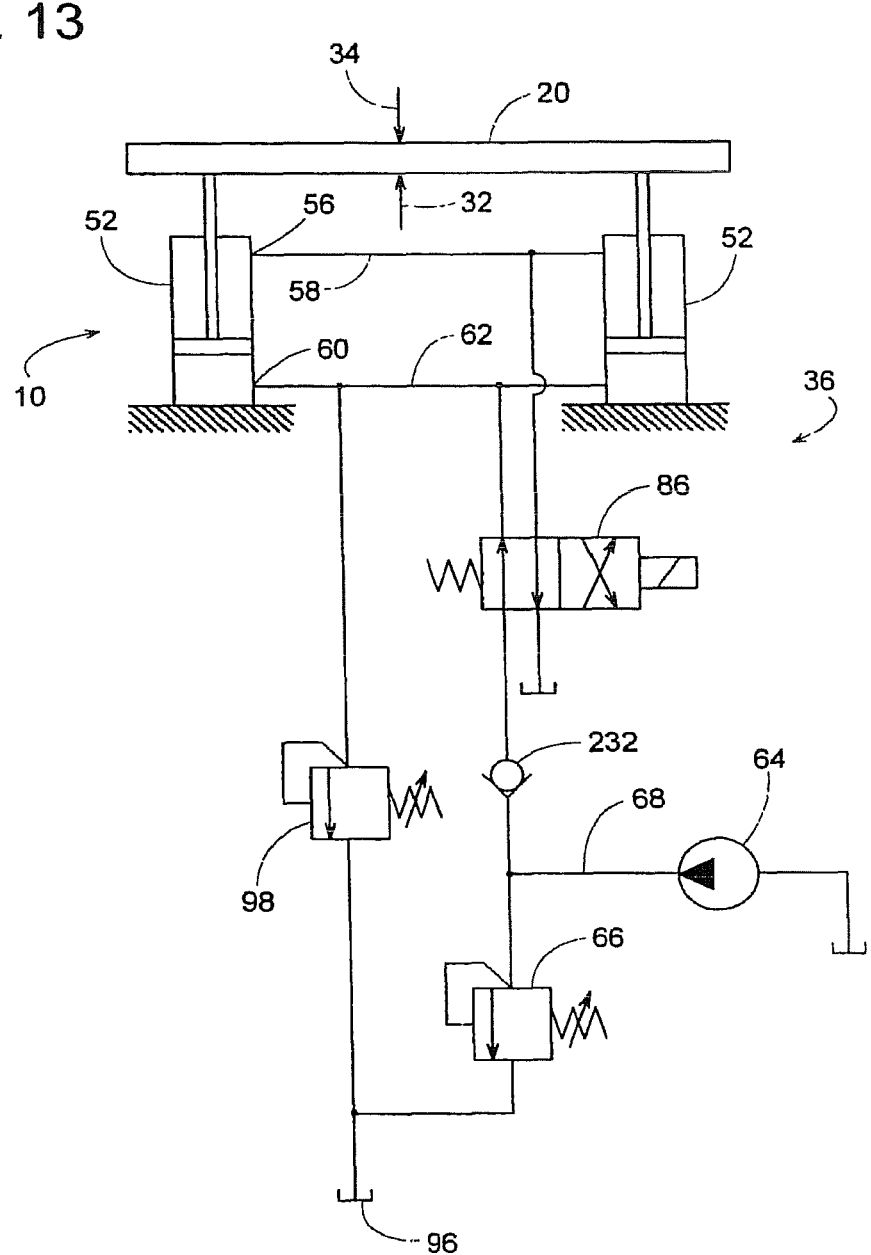
FIG. 13 is a schematic diagram of a hydraulic circuit for controlling the vehicle brace of FIG. 7.
Figure 14:
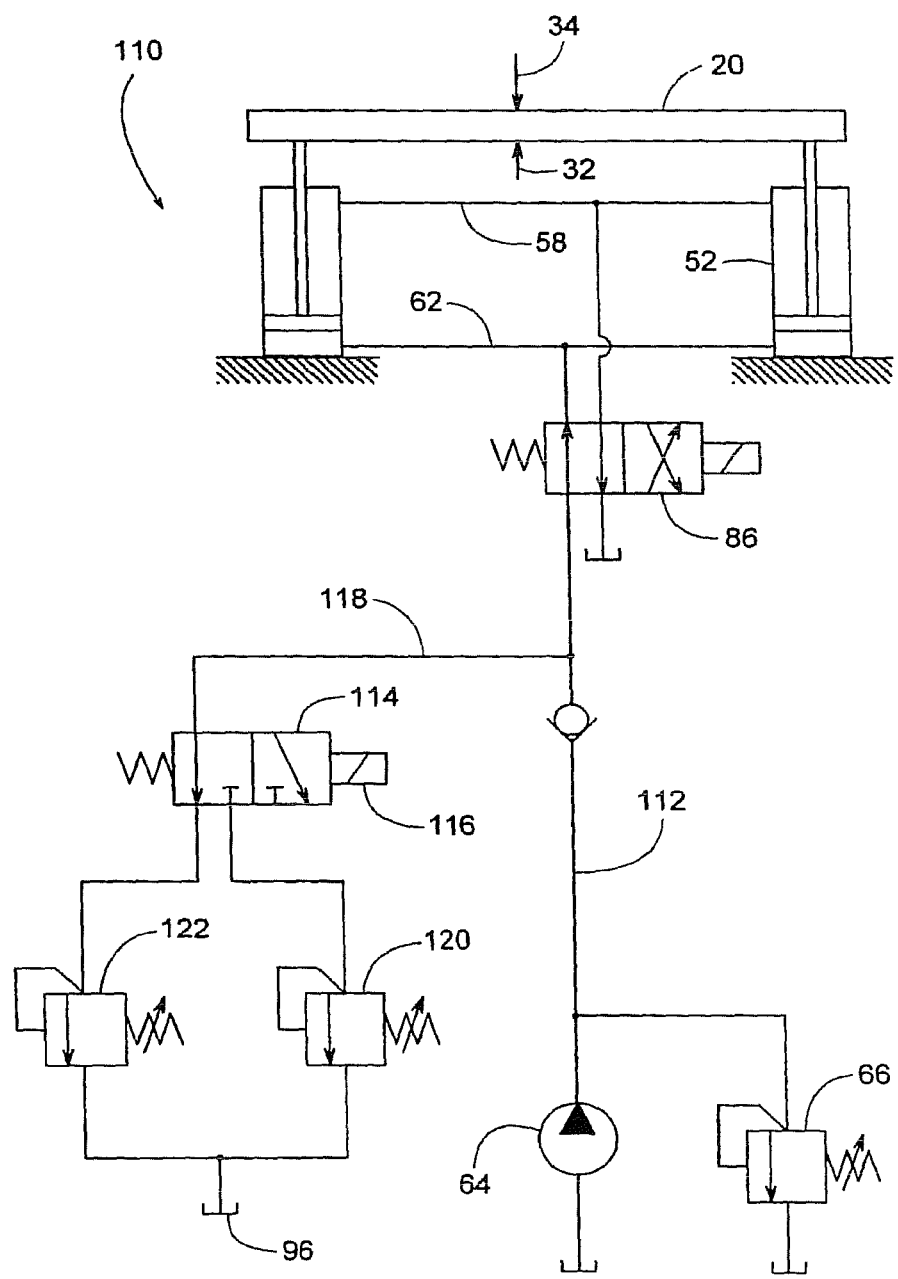
FIG. 14 is a schematic diagram of another hydraulic circuit for controlling the vehicle brace of FIG. 7.

For example, the control of vehicle brace 10 may be responsive to a load sensor 108 as shown in FIG. 9. Load sensor 108 is schematically illustrated to represent any device that senses when weight is being added/removed or is about to be added/removed to or from vehicle 12. Examples of sensor 108 include, but are not limited to, a proximity switch; a photoelectric eye; a switch responsive to strain or movement of dock lever 22, carriage 42, or trailer bed 16; motion detector; infrared detector; an antenna sensing an electromagnetic field, strain gage, load cell, etc. In response to sensor 108, a control system 110 of FIG. 14 can control the operation of vehicle brace 10. Control system 110 provides pressurized hydraulic fluid to a hydraulic line 112, and a three-way, spring return solenoid valve 114 responds to sensor 108 to determine the reactive force 32 that support member 20 is able to exert against bar 18.

In operation, a solenoid 116 of valve 114 is energized when sensor 108 detects that a forklift is about to drive onto trailer bed 16. This places a line 118 of system 110 in fluid communication with a higher-pressure relief valve 120 that is set to only pass hydraulic fluid to tank 96 when downward force 34 exceeds a certain maximum allowable limit, such as 10 tons. Thus, support member 20 holds trailer bed 16 substantially rigid unless excessive downward force is applied to support members 20. When sensor 108 determines that forklift 30 has left trailer bed 16, system 110 responds by de-energizing solenoid 116. This places line 118 in fluid communication with a lower-pressure relief valve 122 set to hold just enough pressure in line 62 to support the movable weight of vehicle brace 10. Valve 122 allows trailer bed 16 to settle to a new lower elevation in reaction to the trailer bed having just received a load from the recently departed forklift. Solenoid valve 114 is repeatedly energized and de-energized as the forklift continues to deliver loads to the trailer bed. The repeated cycling of valve 114 allows the trailer to move downward in reaction to cargo being added, but the downward movement of trailer bed 16 occurs when the forklift is not on the trailer bed. In other words, when the forklift is on the trailer bed, valve 114 enables relief valve 120 to hold the trailer stationary, and when the forklift is off the trailer bed, valve 114 enables relief valve 122 to lower the trailer bed. Since the lowering of the trailer bed occurs when the forklift is on the dock, the driver of the forklift does not experience the unsettling feeling of suddenly dropping upon entering the trailer bed.

When forklift 30 is unloading cargo from vehicle 12, the trailer bed may rise with every load that is removed. System 110 allows support member 20 to follow the upward movement of bar 18 in a manner similar to that of control system 36 of FIG. 13.

When vehicle is ready to depart, valve 86 is actuated to lower support member 20.

Biased-Up, Variable Reaction

Figure 15:
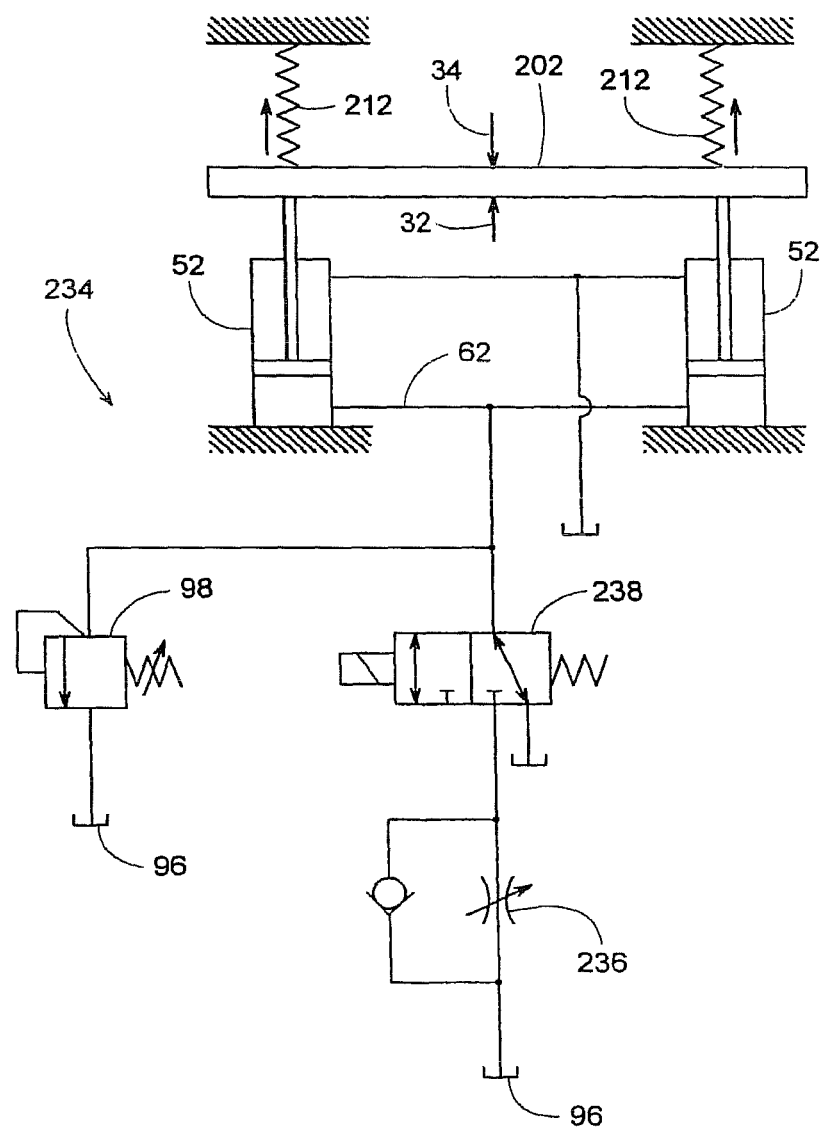
FIG. 15 is a schematic diagram of hydraulic circuit for controlling the vehicle brace of FIG. 1.

Although load sensor 108 and control system 110 enable a vehicle brace to respond to incremental loads as they occur, or shortly thereafter, another control system 234 addresses that same issue by using a flow restriction such as orifice 236 of FIG. 15. Control system 234 can control vehicle brace 200 of FIGS. 1-5 in a manner that will now be described.

De-energizing a two-position, three-way solenoid valve 238 enables springs 212 to bias support member 202 up to its stored position of FIGS. 1 and 2. De-energizing valve 238 also allows vehicle 12 to back its bar 18 over support member 202 until member 18 is at its operative position of FIG. 3. Valve 238 is then energized to place line 62 and the piston side of cylinders 52 in fluid communication with tank 96 via orifice 236. As force 34 increases, due to weight being added to trailer bed 16, the force pushes support member 202 down, which forces cylinders 52 to retract, which in turn forces fluid to flow through orifice 236. The resulting pressure differential developed across orifice 236 increases with the amount of flow. So, the pressure in line 62 and thus the reactive force 32 that support member 202 applies against bar 18 increases with the bar's downward velocity.

If force 34 exceeds a maximum allowable force determined by the relief setting of relief valve 98, then relief valve 98 opens to release the excess pressure in line 62 to tank 96. When relief valve 98 opens, a generally constant pressure is maintained in line 62 and the piston side of cylinders 52. This causes support member 202 to exert a generally constant upward reactive force 32 that slows the descent of bar 18.

Thus, when vehicle brace 200 is controlled by system 234, support member 202 opposes the downward force 34 with a reactive force 32 that increases with the downward force 34 or the downward velocity of bar 18 but does so only up to a predetermined maximum allowable force. When downward force 34 exceeds the maximum allowable limit, reactive force 32 is generally constant to slow the descent of bar 18.

Powered-Up, Variable Reaction

Figure 16:
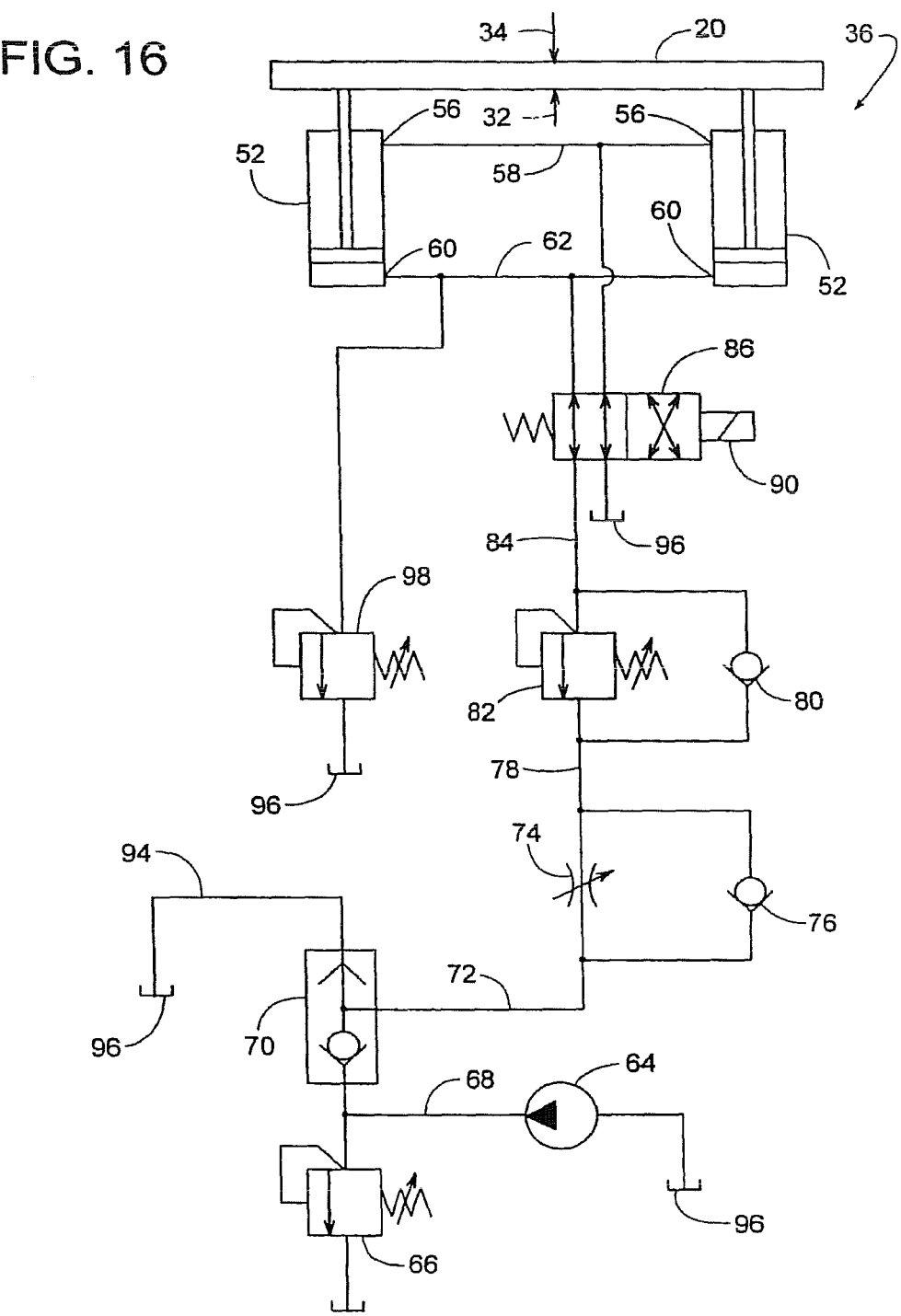
FIG. 16 is a schematic diagram of another hydraulic circuit for controlling the vehicle brace of FIG. 7.

The powered-up vehicle brace 10 of FIGS. 7-12 can also be controlled to operate in a similar manner. When controlled by system 36 of FIG. 16, support member 20 opposes the downward force 34 with a reactive force 32 that increases with the downward force 34 or the downward velocity of bar 18 but does so only up to a predetermined maximum allowable force. When downward force 34 exceeds the maximum allowable limit, reactive force 32 is generally constant to slow the descent of bar 18.

Each cylinder 52 has one port 56 connected to a hydraulic line 58 of system 36 and a second port 60 connected to a line 62. The hydraulic pressure in lines 58 and 62 determine the action of cylinders 52. Hydraulic pump 64 provides system 36 with hydraulic pressure in a conventional manner. For instance, pump 64 can be cycled on and off as needed, or the pump can be associated with an appropriate system relief valve 66, and/or pump 64 could be a variable capacity pump. Regardless, pump 64 supplies pressurized hydraulic fluid at a discharge line 68, which feeds into a shuttle valve 70. Shuttle valve 70 connects discharge line 68 to a line 72 that leads to a flow restriction 74 (e.g., an orifice) and a bypass check valve 76. Another line 78 connects flow restriction 74 and check valve 76 to another check valve 80 and a first pressure relief valve 82. Another line 84 connects valves 80 and 82 to a two-position, four-way valve 86, which is actuated by solenoid 90. Valve 86 is used by loading dock personnel to raise or lower support member 20.

In operation, a dockworker may actuate solenoid 90 to lower carriage 42, which allows vehicle 12 to back into dock 14 and position bar 18 over support member 20. Actuating solenoid 90 pressurizes line 58 as hydraulic fluid at discharge pressure passes in series through line 68, shuttle valve 70, line 72, check valves 76 and 80, four-way valve 86, and line 58.

Once, bar 18 is directly over support member 20, the dockworker de-energizes solenoid 90 and energizes pump 64 to pressurize line 62. This raises carriage 42 until support member 20 and a limit switch 92, carried by carriage 42, engage the underside of bar 18. Switch 92 engaging bar 18 de-energizes pump 64; however, check valve 80 and relief valve 82 still maintain sufficient pressure in lines 62 and 84 to hold support member 20 up against bar 18. In others words, relief valve 82 is set to maintain a pressure that is just enough to support the weight of carriage 42, support members 20, and hook 48. So, hook 48 is now at a height where it can help prevent vehicle 12 from accidentally pulling bar 18 away from dock 14, and support member 20 can help stabilize trailer bed 16 in the following manner.

If a certain amount of weight were added to trailer bed 16, bar 18 would exert a downward force 34 that would push support member 20 downward. The downward movement would force hydraulic fluid from within cylinders 52 and pressurize lines 62 and 84 to a level beyond what relief valve 82 could hold. In response to the increased pressure, valve 82 would open to pass the hydraulic fluid into line 78. From line 78, the hydraulic fluid would pass in series through flow restriction 74, line 72, and shuttle valve 70. Valve 70 would then release the hydraulic fluid to a return line 94 that connects to a tank 96, which in turn provides pump 64 with hydraulic fluid.

As hydraulic fluid is forced through flow restriction 74, the resulting pressure drop developed across the restriction allows the pressure in line 62 and cylinders 52 to increase. The increased pressure in cylinders 52 then opposes the downward movement of bar 18 to provide bar 18 with a controlled descent (i.e., appreciably or noticeably slowing the descent of bar 18). Since the pressure drop across restriction 74 increases with the flow rate through the restriction, the opposing upward force 32 of support member 20 increases with the downward velocity of bar 18.

If the downward force 34 exceeds a predetermined maximum allowable limit, a second relief valve 98 releases the excess pressure in line 62 to tank 96 to avoid damaging vehicle 12. For instance, if vehicle 12 has an air suspension system and the driver of the vehicle decides to deactivate the system by dumping or exhausting the system's air, trailer bed 16 may suddenly descend with its entire load, thereby rapidly forcing support member 20 down. This could result in extreme pressure developing in line 62, which could cause an excessive upward force 32 being applied to the underside of bar 18. An excessive upward force could damage the bar or other parts of the trailer. So, relief valve 98 limits the maximum allowable upward force that could be exerted by support members 20 against bar 18. In some embodiments, relief valve 98 is set to provide a maximum allowable upward force of five to ten tons.

If vehicle 12 does not have an air suspension system or its air suspension system is kept in its active state, then the suspension system will likely lift the trailer bed when forklift 30 departs or a significant amount of weight is otherwise removed suddenly from the vehicle. Thus, vehicle 12 might lift bar 18 off of limit switch 92 and support members 20. Bar 18 separating from switch 92 energizes pump 64. This pressurizes lines 68, 72, 78, 84, and 62 to raise carriage 42. Check valve 76 is in a bypass relationship with flow restriction 74 to allow carriage 42 to move more freely upward than downward. Carriage 42 rises until switch 92 and support members 20 once again engage the underside of bar 18 to help stabilize trailer bed 16.

Frictional Reaction

Figure 17:
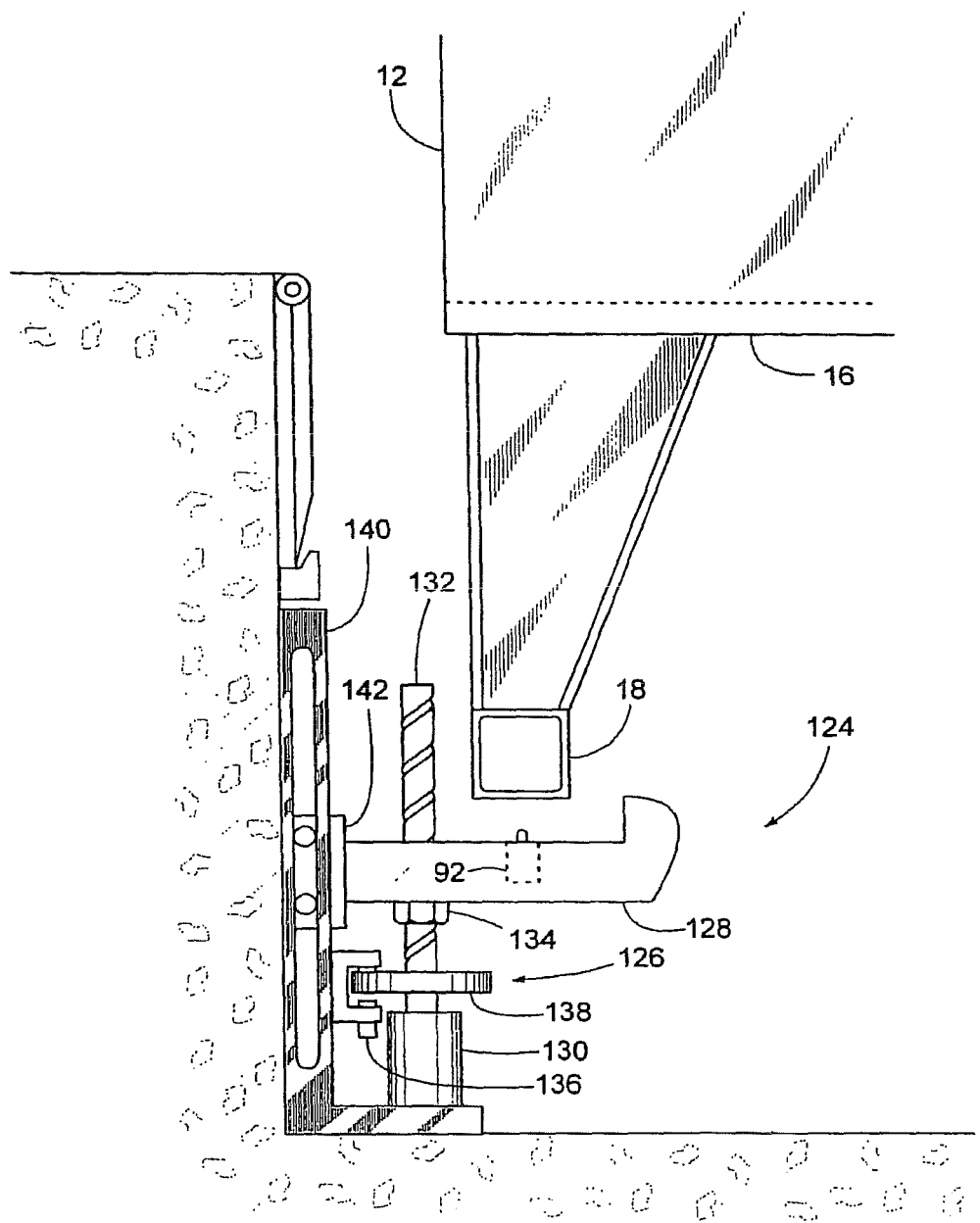
FIG. 17 is a side view of another vehicle brace.
Figure 18:
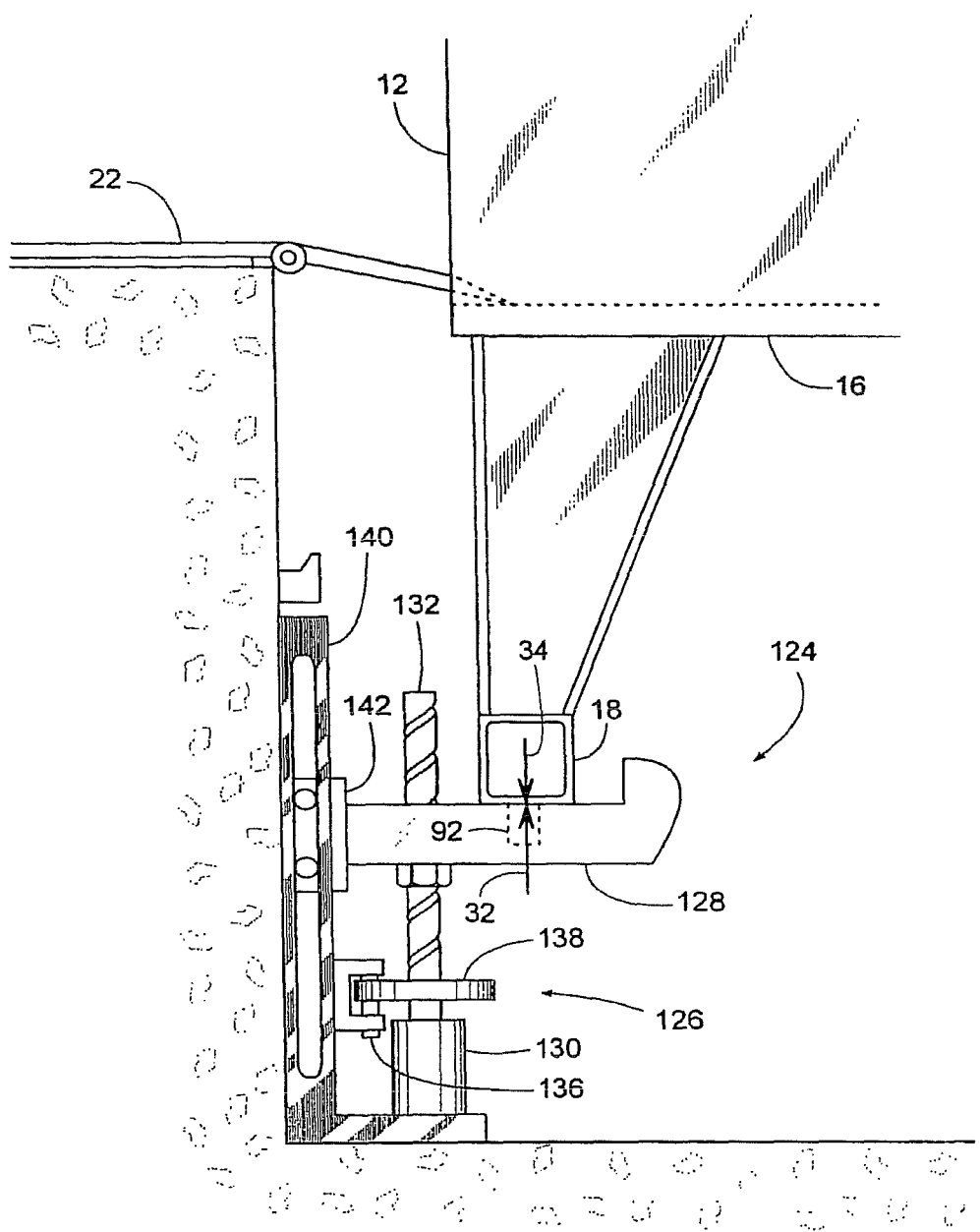
FIG. 18 is a side view similar to FIG. 17 but showing the brace raised and showing a dock leveler in its operative position.

In another embodiment, schematically illustrated in FIGS. 17 and 18, a vehicle brace 124 includes a frictional brake 126 that enables a support member 128 to exert a reactive force 32 that helps stabilize trailer bed 16. In FIG. 17, support member 128 is shown in a lowered position that allows vehicle 12 to back its bar 18 over member 128. Once bar 18 is directly over support member 128, brake 126 releases, and brace 124 lifts member 128 until member 128 engages the underside of bar 18. At this point, brake 126 is actuated to provide some resistance to downward movement of bar 18 and support member 128.

To accomplish such operation, brace 124 includes a motor 130 that rotates a lead screw 132. Lead screw 132 screws into a threaded nut 134 that is attached to support member 128. So, rotating lead screw 132 can raise support member 128. Conversely, forcing support member 128 downward can rotate lead screw 132, provided the helix angle of screw 132 is sufficiently steep and the friction between screw 132 and nut 134 is sufficiently low as provided by, for example, a ball screw device. Brake 126 comprises brake calipers 136 that selectively engage a brake disc 138 on lead screw 132. A track 140 and carriage 142 help guide the vertical movement of support member 128. To move support member 128 upward, brake calipers 136 release disc 138, and motor 130 rotates counterclockwise (looking upward) until switch 92 engages bar 18. Switch 92 engaging bar 18 de-energizes motor 130 and causes calipers 136 to grip disc 138 with a predetermined or variable magnitude of resistance. Then, as weight is added to trailer bed 16, bar 18 pushes downward against support member 128, which urges lead screw 132 to turn clockwise. Brake 126, however, resists the rotation of lead screw 132, so brake 126 enables support member 128 to exert reactive force 32 against bar 18, thereby opposing the downward movement of bar 18 and stabilizing trailer bed 16.

Spring Reaction

Figure 19:
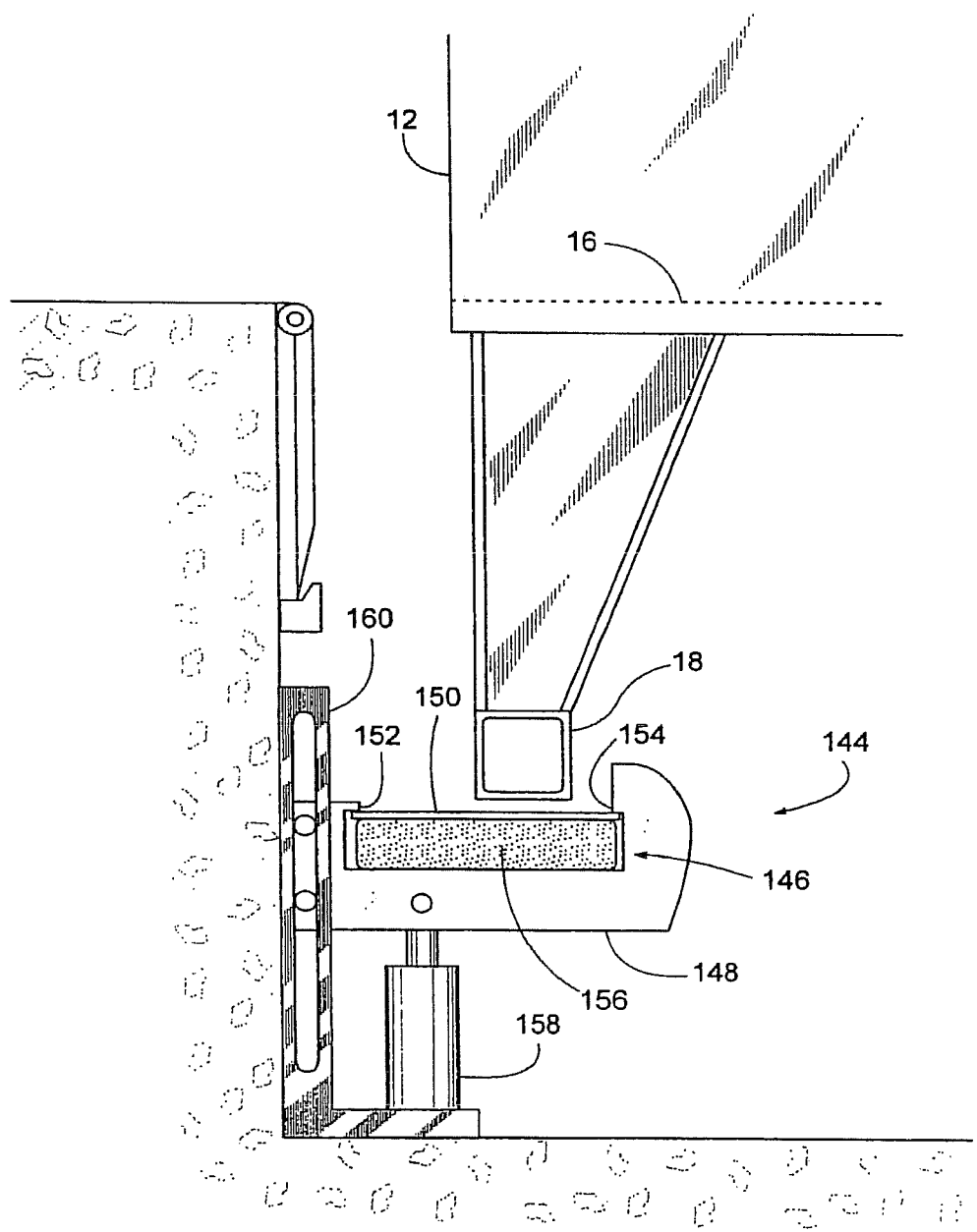
FIG. 19 is a side view of another vehicle brace.

In another embodiment, shown in FIGS. 19 and 20, a vehicle brace 144 includes a spring 146 whose stored energy enables a support member 148 to exert a reactive force 32 against bar 18, which helps stabilize trailer bed 16 during loading and unloading operations. Spring 146 represents any restorative device that can store and release mechanical energy. Examples of spring 146 include, but are not limited to, one or more leaf springs, coil springs, air springs, air cylinder springs, polyurethane springs, series of Belleville washers, etc. In some embodiments, spring 146 of support member 148 includes a metal top plate 150 that engages two restraining edges 152 and 154 of support member 148 to hold a resiliently compressible polyurethane block 156 in a preloaded, partially compressed state, as shown in FIG. 19.

An actuator 158 is connected to move support member 148 vertically along a track 160. Actuator 158 is schematically illustrated to represent any device adapted for moving support member 148. Examples of actuator 158 include, but are not limited to a gas filled piston/cylinder, a liquid filled piston/cylinder, rodless cylinder, spring-return piston/cylinder, vehicle-operated actuator, linear motor, chain and sprocket, rack and pinion, winch, electric motor, hydraulic motor, air powered motor, pressurized fluid filled bladder, spring, etc.

In operation, actuator 158 lifts support member 148 until top plate 150 of member 148 is up against bar 18. If bar 18 exerts a downward force 34 that is within a certain allowable range, then actuator 158 stays still (i.e. does not compress or yield), and spring 146 compresses to resist the downward movement of trailer bed 16. If, however, downward force 34 becomes excessive and beyond the allowable range, then actuator 158 is allowed to descend until force 34 is once again with the allowable range.

Such and arrangement—including a spring for reacting applied forces in a first allowable range, and the actuator for reacting higher applied forces, may be beneficial in certain applications. The stiffness accompanying the significant and responsive reactive force of the actuator may not be desirable for small movements of the trailer. By providing a first, smaller applied force yield path through the spring, such smaller movements are reacted according to a linear response (since springs generally obey Hooke's law that force is proportional to displacement) rather than the potentially stiffer, non-linear response from the actuator's fluid flowing through an orifice, or other types of control mechanisms described herein.

Figure 19A:
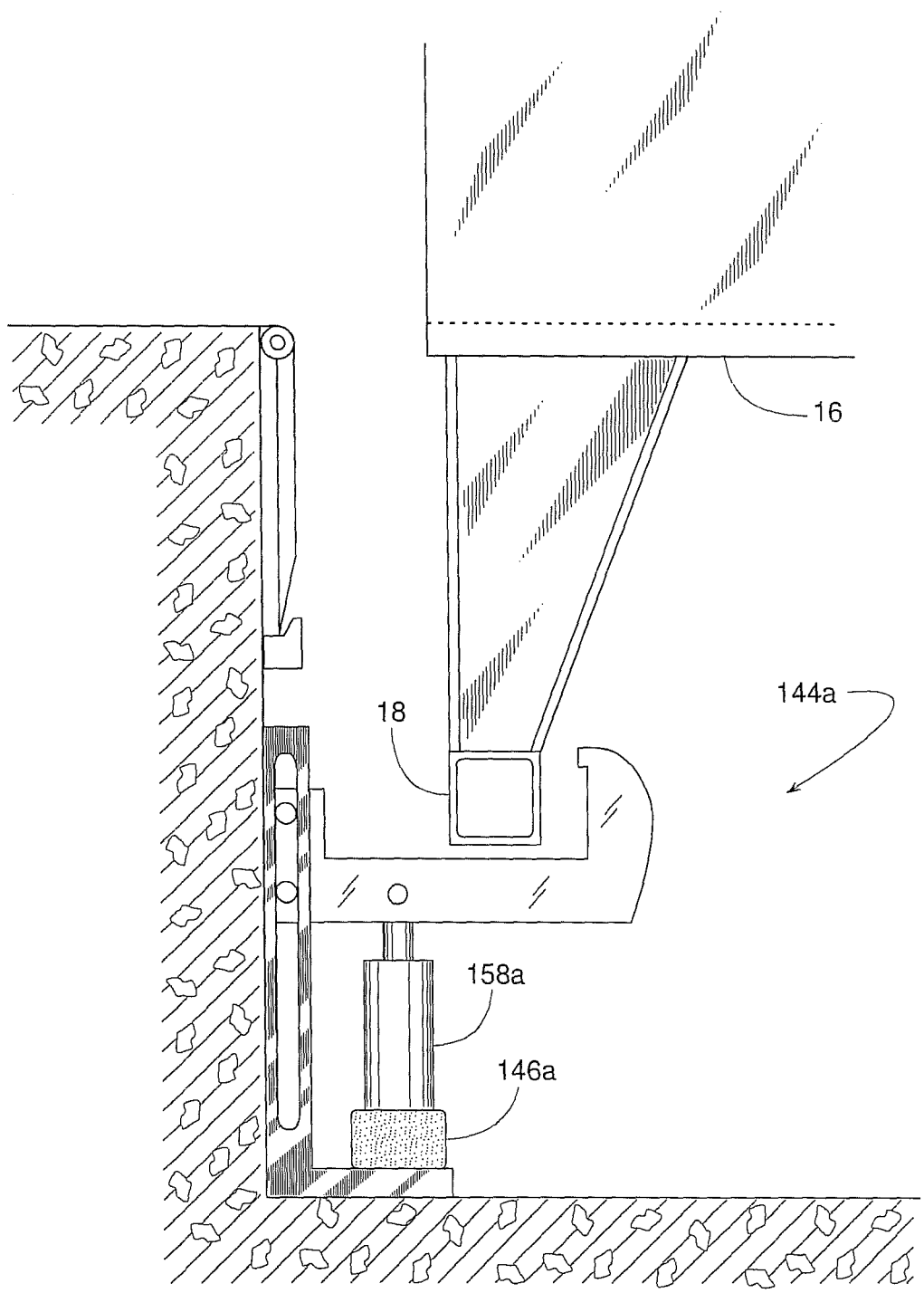
FIG. 19a is a side view of another vehicle brace.

In a similar embodiment, shown in FIGS. 19a and 20a (which correspond to FIGS. 19 and 20 respectively), a vehicle brace 144a includes a spring 146a that is installed underneath an actuator 158a. The function of brace 144a, spring 146a and actuator 158a is comparable to that of brace 144, spring 146 and actuator 158 respectively (from FIGS. 19 & 20). Specifically, if bar 18 exerts a downward force 34 that is within a certain allowable range (equal or less than reactive force 32), then actuator 158a stays still, and spring 146a compresses to resist the downward movement of trailer bed 16. If, however, downward force 34 becomes excessive and beyond the allowable range, then actuator 158a is allowed to descend (via one of the control systems described and illustrated herein) until force 34 is once again with the allowable range. Examples of actuator 158a include, but are not limited to a gas filled piston/cylinder, a liquid filled piston/cylinder, rodless cylinder, spring-return piston/cylinder, vehicle-operated actuator, linear motor, chain and sprocket, rack and pinion, winch, electric motor, hydraulic motor, air powered motor, pressurized fluid filled bladder, spring, etc. Examples of spring 146a include, but are not limited to, one or more leaf springs, coil springs, air springs, air cylinder springs, resilient polymeric material (e.g., polyurethane spring), series of Belleville washers, etc.

Figure 19B:
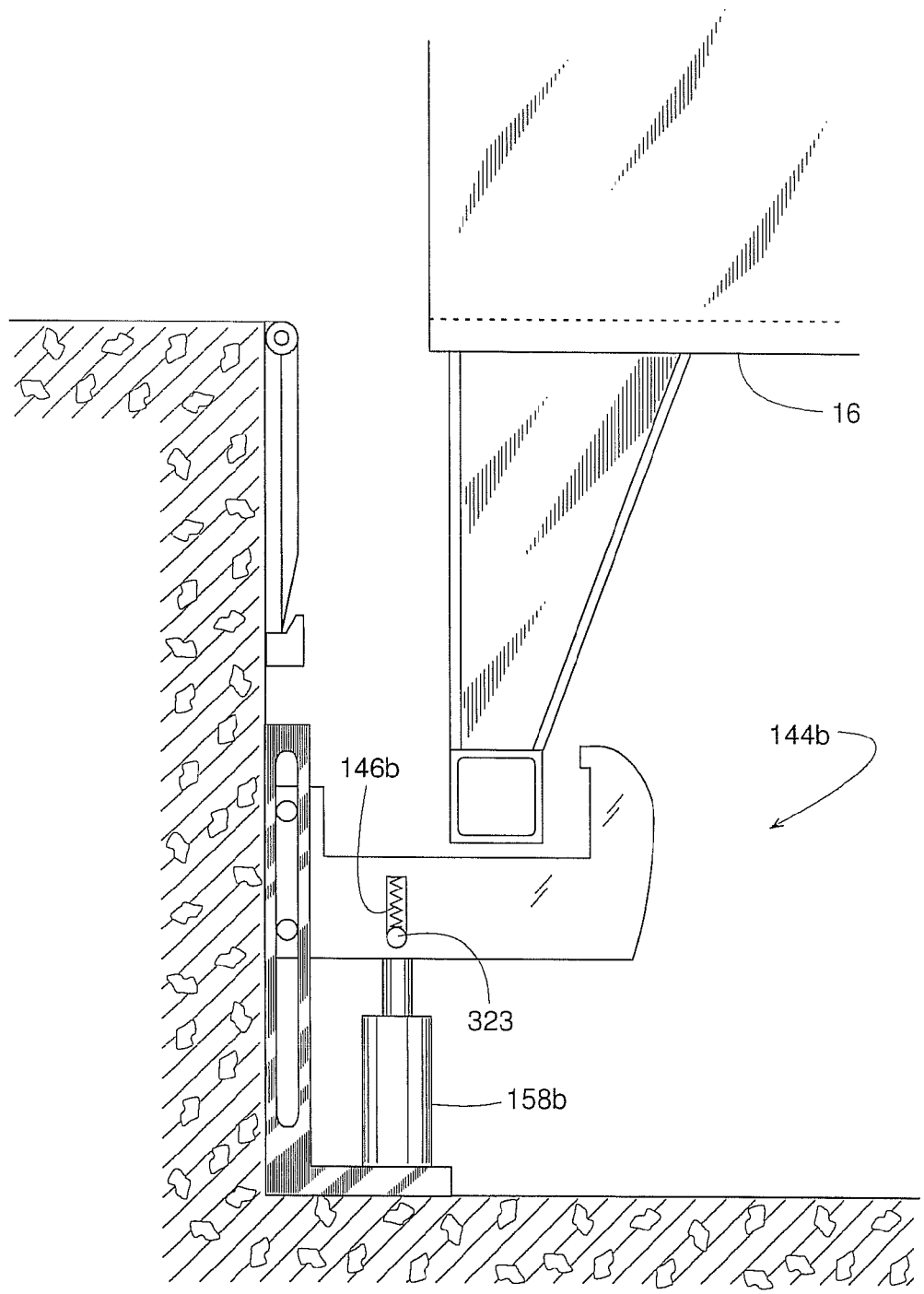
FIG. 19b is a side view of another vehicle brace.

In a similar embodiment, shown in FIGS. 19b and 20b (which also correspond to FIGS. 19 and 20 respectively), a vehicle brace 144b includes a spring 146b that is installed between an actuator 158b and a support member 148b. Spring 146b, for example, can be installed where an upper end 323 of actuator 158b is movably coupled to support member 148b. The function of brace 144b, support member 148b, spring 146b and actuator 158b is comparable to that of brace 144, support member 148, spring 146 and actuator 158 respectively. Specifically, if bar 18 exerts a downward force 34 that is within a certain allowable range (equal or less than reactive force 32, then actuator 158b stays still, and spring 146b compresses to resist the downward movement of trailer bed 16. If, however, downward force 34 becomes excessive and beyond the allowable range, then actuator 158b is allowed to descend (via one of the control systems described and illustrated herein) until force 34 is once again with the allowable range. Examples of actuator 158b include, but are not limited to a gas filled piston/cylinder, a liquid filled piston/cylinder, rodless cylinder, spring-return piston/cylinder, vehicle-operated actuator, linear motor, chain and sprocket, rack and pinion, winch, electric motor, hydraulic motor, air powered motor, pressurized fluid filled bladder, spring, etc. Examples of spring 146b include, but are not limited to, one or more leaf springs, coil springs, air springs, air cylinder springs, resilient polymeric material (e.g., polyurethane spring), series of Belleville washers, etc.

Idealized Reaction

Figure 21:
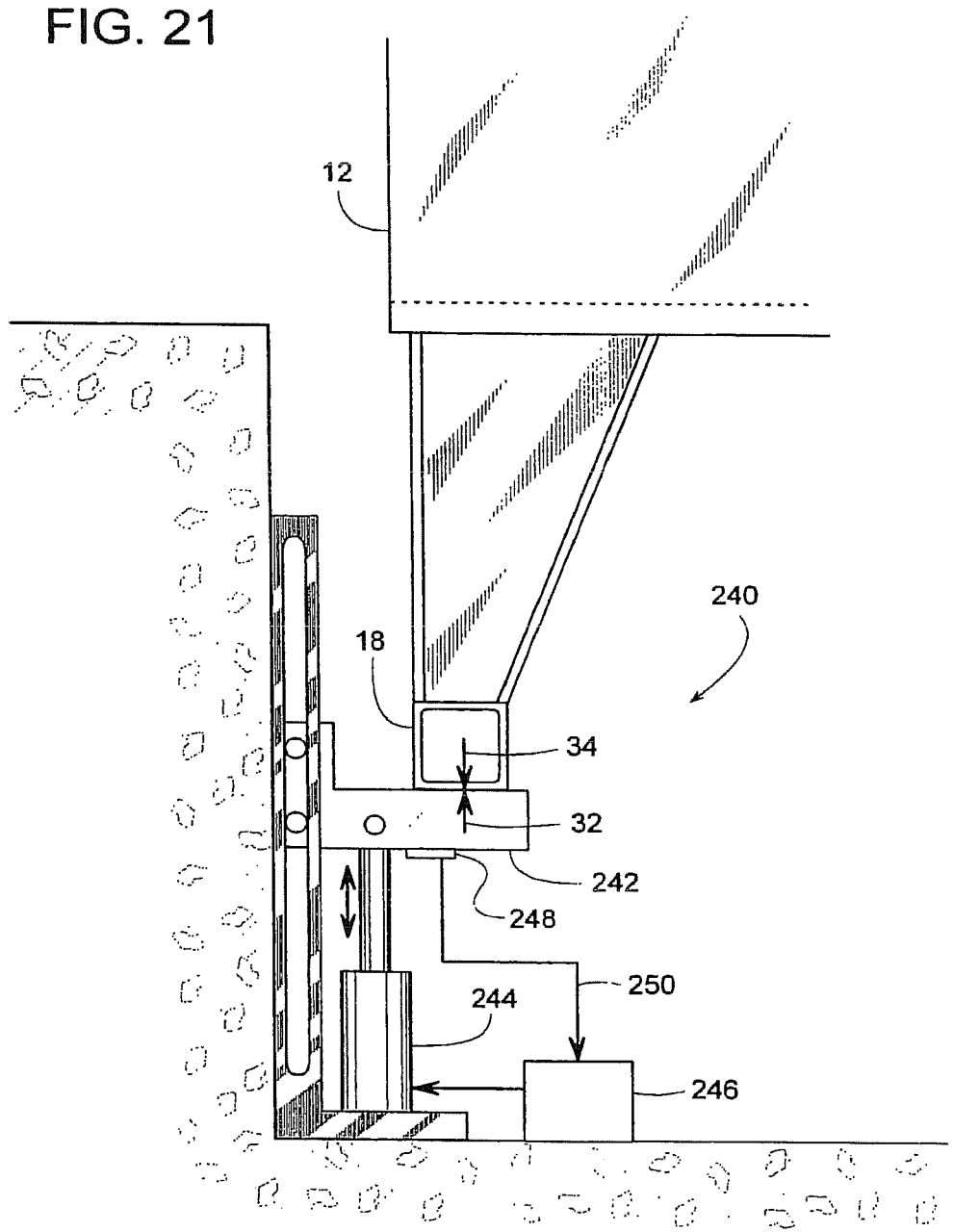
FIG. 21 is a somewhat schematic diagram of an idealized vehicle brace.

For the embodiment of FIG. 21, a vehicle brace 240 comprises a vertically movable support member 242, an actuator 244 for moving support member 242, and a control system 246 that controls the support member's movement in response to a sensor 248. Actuator 244 is schematically illustrated to represent any device that can move support member 242. Examples of actuator 244 include, but are not limited to, gas filled piston/cylinder, a liquid filled piston/cylinder, rodless cylinder, spring-return piston/cylinder, linear motor, chain and sprocket, rack and pinion, winch, electric motor, hydraulic motor, air powered motor, pressurized fluid filled bladder, etc. Sensor 248 is schematically illustrated to represent any device that can detect a load or force 34 being applied to support member 242 and provide feedback 250 that corresponds to the load. Examples of sensor 248 include but are not limited to, a strain gage, load cell, weight scale, pressure sensor, etc. Control system 246 is schematically illustrated to represent any device that can control actuator 244 in response to feedback 250 from sensor 248. Examples of control system 246 include, but are not limited to a computer; microprocessor; PLC (programmable logic controller); integrated circuits; circuits comprising relays, analog components, and/or digital components; and various combinations thereof.

As bar 18 exerts force 34 down against support member 242, sensor 248 detects the magnitude of force 34 and provides that information as feedback 250 to control system 246. In response to feedback 250, control system 246 commands actuator 244 to raise or lower support member 242 so that member 242 exerts an appropriate upward reactive force 32 that opposes force 34. The results provided by vehicle brace 240 could be an idealized response, or brace 240 could emulate any one of the various vehicle braces already described.

Figure 22:
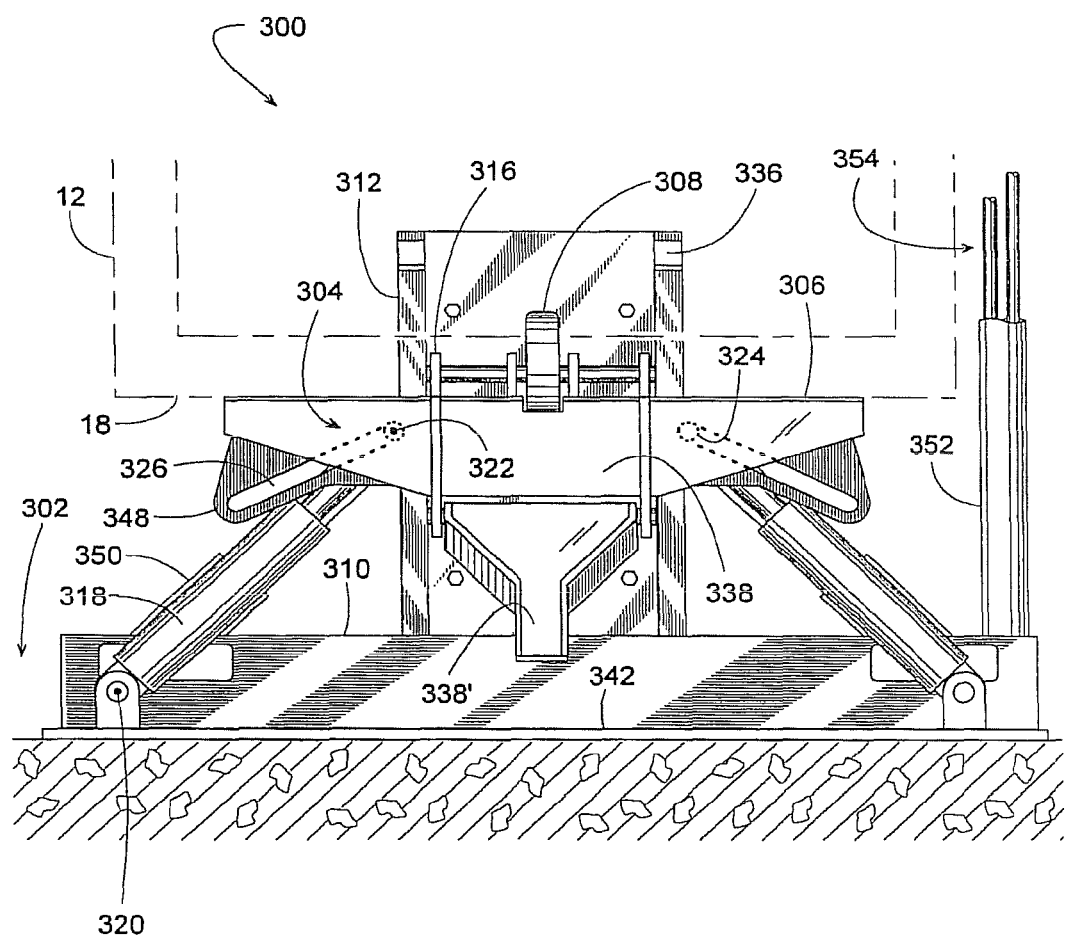
FIG. 22 is a front view of another vehicle brace in a preparatory position.
Figure 23:
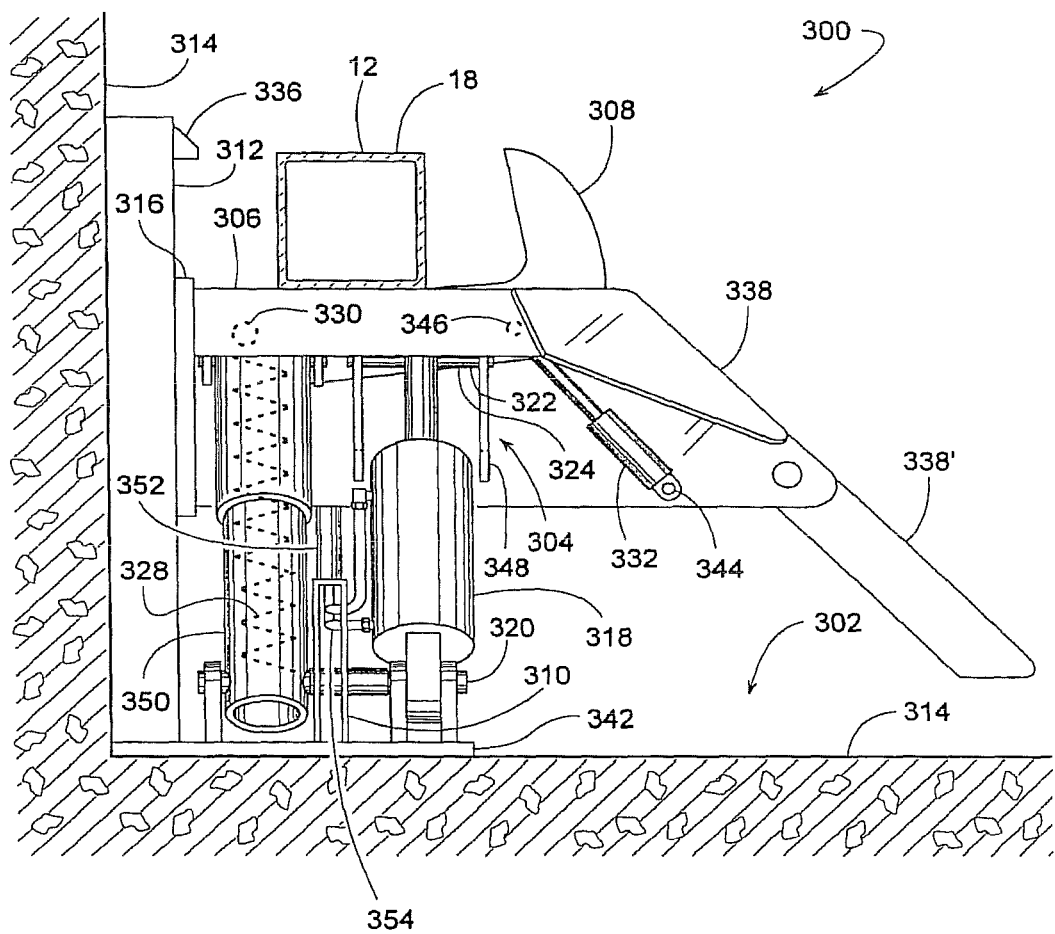
FIG. 23 is a side view of the vehicle brace of FIG. 22.

In another embodiment, shown in FIGS. 22 and 23, a vehicle brace 300 installed at a loading dock 302 is similar to brace 200 of FIG. 1-5; however, brace 300 provides some additional benefits.

Figure 24A:
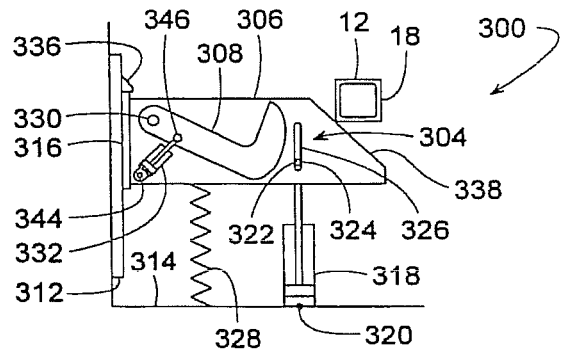
FIG. 24a is a schematic side view of the vehicle brace of FIGS. 22 and 23 but showing the brace in a stored preparatory position.
Figure 24B:
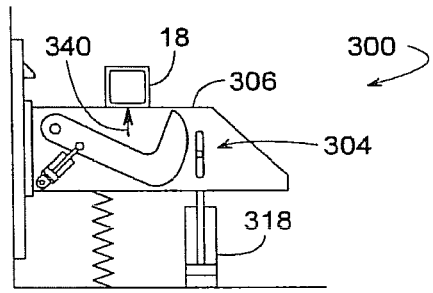
FIG. 24b is a schematic side view similar to FIG. 24a but showing the brace immediately after the vehicle has backed into the dock.

First, brace 300 includes a release mechanism 304 that enables the brace's upwardly spring-loaded support member 306 to descend quickly in response to ICC bar 18 forcing the support member down as vehicle 12 backs into the loading dock, as schematically shown in FIGS. 24a and 24b. With release mechanism 304, support member 306 can descend quickly because the movement does not require displacement of hydraulic fluid, which could otherwise dampen or slow the descent. If the downward movement of support member 306 were hydraulically dampened as vehicle 12 backs into the dock, member 306 could possibly exert a damagingly high reactive force up against ICC bar 18.

Second, once support member 306 is actively supporting ICC bar 18, release mechanism 304 allows support member 306 to rise quickly in response to bar 18 suddenly rising due to a load being removed from the vehicle's truck or trailer bed. Again, release mechanism 304 enables the quick movement because hydraulic fluid does not always have to be displaced when member 306 moves upward. This ability is particularly useful in cases where brace 300 includes a vehicle-restraining member 308 or hook that engages an ICC bar 18 to limit forward movement of the vehicle away from the loading dock. If the support member's movement always required displacement of hydraulic fluid, rapid raising of bar 18 could result in the hook losing engagement with bar 18. The ability of support member 306 to quickly follow the upward movement of bar 18 prevents bar 18 from suddenly lifting up and over the vehicle-restraining member.

Third, while release mechanism 304 permits quick and easy movement of support member 306 when vehicle 12 first backs into the dock and when vehicle 12 tries jouncing (i.e., vehicle's suspension allowing repeated up and down movement of the vehicle in response to weight being added or removed from the vehicle) during loading and unloading operations, brace 300 may also include a locking feature that helps prevent theft of a trailer engaged by brace 300. The locking feature maintains sufficient pressure in the hydraulic lines that raise support member 306 and/or vehicle-restraining member 308, thus making it very difficult for a thief to manually force support member 306 or vehicle-restraining member 308 away from ICC bar 18. To prevent a thief from defeating the locking feature by cutting one or more hydraulic lines, suitable guards 310 and 352 or metallic braided hose covers or the like may be utilized to protect the lines.

The operation of vehicle brace 300 can be better understood with reference to the schematic diagrams of FIGS. 24a-24d. These schematics show brace 300 comprising support member 306 for minimizing the jouncing of a vehicle's rear edge or its ICC bar 18, a track 312 attached to a dock structure 314 (e.g., floor, wall, dock leveler frame, or some other suitable mounting surface in the area), a carriage 316 that supports support member 306 and travels along track 312, an actuator 318 (e.g., piston/cylinder, linear motor, drive screw, winch, hydraulic motor, bladder, etc.) extending between a base point 320 and a support point 322 for selectively exerting an upward force against support member 306, release mechanism 304 (e.g., a protrusion 324 extending from actuator 318 and sliding within a slot 326 in support member 306) for permitting support member 306 under certain circumstances to move without actuator 318 having to necessarily extend or retract, a spring 328 for urging support member 306 upward, vehicle-restraining member 308 pivotal about a pin 330 for selectively blocking or releasing ICC bar 18, and an actuator 332 (e.g., piston/cylinder, linear motor, drive screw, winch, hydraulic motor, bladder, etc) for moving vehicle restraining member 308 between its blocking position (FIGS. 24c and 24d) and its non-blocking position (FIGS. 24a and 24b).

FIG. 24a shows vehicle brace 300 in its stored position. In this example, actuators 318 and 332 are hydraulic cylinders that are controlled by a hydraulic circuit 334 shown in FIG. 27. In the stored position, spring 328 biases support member 306 up against a mechanical stop 336, and actuator 318 is retracted. With support member 306 starting at the stored position, vehicle 12 backs into the dock. This causes the vehicle's ICC bar 18 to engage a forward-facing cam surface 338 of support member 306 and push member 306 down against the upward force of spring 328 as bar 18 slides over cam surface 338 and comes to rest at the position shown in FIG. 24b. As bar 18 moves quickly from its position of FIG. 24a to its position of FIG. 24b, release mechanism 304 (relative sliding motion between protrusion 324 and slot 326) allows support member 306 to descend rapidly without being hindered by actuator 318 having to displace hydraulic fluid. With brace 300 in the position of FIG. 24b, spring 328 causes support member 306 to exert an upward force 340 of a magnitude that is sufficient to maintain member 306 in contact with bar 18.

Figure 24C:
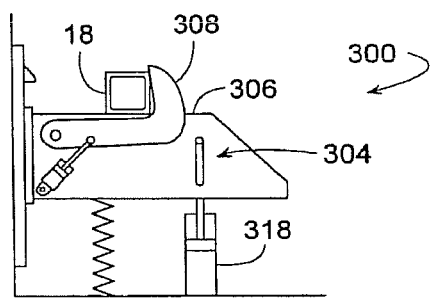
FIG. 24c is a schematic side view similar to FIG. 24b but showing the brace in a preparatory position.

To help prevent vehicle 12 from accidentally pulling too far away from the dock, actuator 332 can raise vehicle restraining member 308 from its lowered, non-blocking position of FIG. 24b to its blocking position of FIG. 24c.

In addition, to dampen jouncing of bar 18 as vehicle 12 is being loaded or unloaded of its cargo, actuator 318 can extend to move protrusion 324 to its upper travel limit within slot 326, as shown in FIG. 24c. Actuator 318 pushing protrusion 324 up against the upper end of slot 326 causes support member 306 to exert upward force 340 at a magnitude that is greater than that which can be achieved by spring 328 alone. At this point in the operation (FIG. 24c), circuit 334 restricts or dampens the compression of actuator 318 in a manner that will be explained later with reference to FIG. 27. With protrusion 324 engaging an upper edge of slot 326 and circuit 334 restricting or dampening the retraction of actuator 318, support member 306 is able to stabilize or minimize the jouncing of vehicle 12 by exerting a substantial reactive force (upward force 340) in response to vehicle 12 urging bar 18 downward as a load or other weight is added to vehicle 12. Depending on the design of circuit 334, the reactive force can be comparable to that which was achieved in the embodiments that were described earlier with reference to FIGS. 1-21.

Figure 24D:
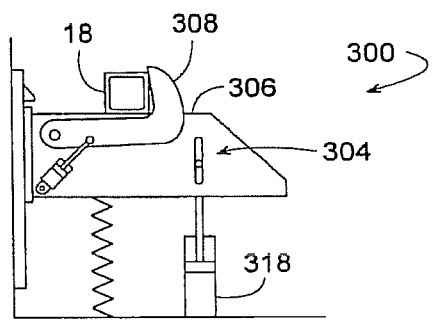
FIG. 24d is a schematic side view similar to FIG. 24c but showing the brace having just responded to a sudden rise in the vehicle's ICC bar.
Figure 25A:
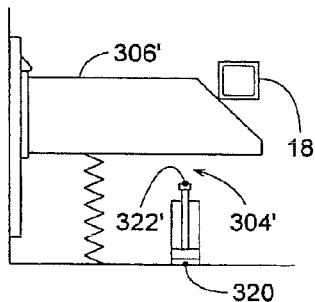
FIG. 25a is a schematic side view similar to FIG. 24a but of another embodiment.
Figure 25B:
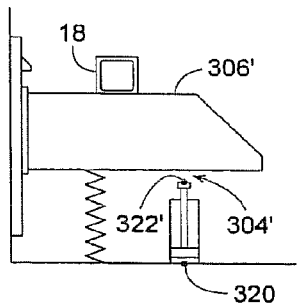
FIG. 25b is a schematic side view similar to FIG. 24b but of another embodiment.
Figure 25C:
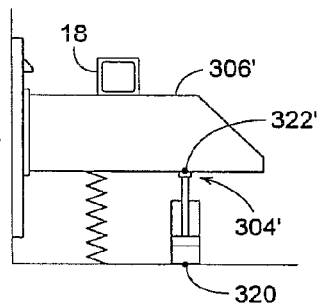
FIG. 25c is a schematic side view similar to FIG. 24c but of another embodiment.
Figure 25D:
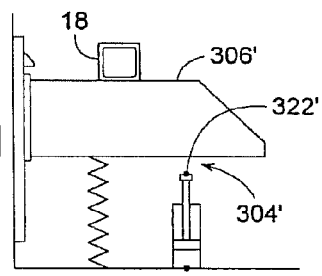
FIG. 25d is a schematic side view similar to FIG. 24d but of another embodiment.
Figure 26A:
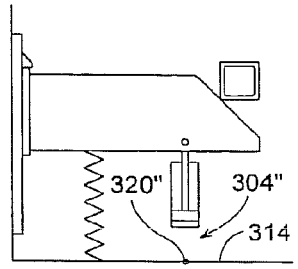
FIG. 26a is a schematic side view similar to FIG. 24a but of yet another embodiment.
Figure 26B:
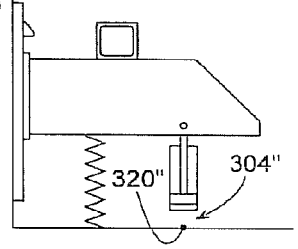
FIG. 26b is a schematic side view similar to FIG. 24b but of another embodiment.
Figure 26C:
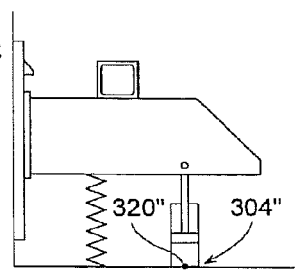
FIG. 26c is a schematic side view similar to FIG. 24c but of another embodiment.
Figure 26D:
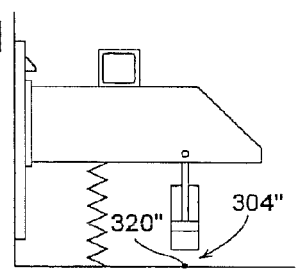
FIG. 26d is a schematic side view similar to FIG. 24d but of another embodiment.

If bar 18 suddenly moves upward from the position of FIG. 24c to that of FIG. 24d in response to a load being removed from vehicle 12, release mechanism 304 (e.g., protrusion 324 being able to slide within slot 326) allows spring 328 to quickly push support member 306 upward to follow the bar's upward movement. The quick response is possible because the support member's upward movement is accomplished without actuator 318 having to extend or displace hydraulic fluid.

During the sudden upward movement of bar 18 (moving from FIG. 24c to FIG. 24d), support member 306 initially moves a certain distance without a significant change in the distance between points 320 and 322 of actuator 318. Likewise, during the sudden downward movement of support member 306 (moving from FIG. 24a to FIG. 24b), support member 306 initially moves a certain distance without a significant change in the distance between points 320 and 322. The delay or difference between the support member's movement and the insignificant relative movement between points 320 and 322 can be accomplished with various types of release mechanisms including, but not limited to, release mechanism 304 of FIGS. 24a-24d, a release mechanism 304' of FIGS. 25a-25d, and release mechanism 304" of FIGS. 26a-26d.

FIGS. 25a-25d and FIGS. 26a-26d correspond to FIGS. 24a-24d respectively, wherein the end results of the various illustrated embodiments are basically the same. Release mechanism 304 permits relative translation between support member 306 and support point 322, release mechanism 304' permits relative translation between a support member 306' and a support point 322', and release mechanism 304" permits relative translation between a base point 320" and dock structure 314. The schematic illustrations of FIGS. 24a-24d most closely represent the structure of FIGS. 22 and 23.

For the embodiment of FIGS. 22 and 23, vehicle brace 300 comprises a base plate 342 anchored to dock structure 314, an articulated guide 338' or cam surface pivotally attached to support member 306, track 312 mounted to dock structure 314, and carriage 316 that supports support member 306 and travels along track 312.

Vehicle brace 300 may also include the optional vehicle-restraining member 308 that helps prevent vehicle 12 from prematurely pulling away from the loading dock. The vehicle-restraining member can be fixed or movable relative to support member 306. For a fixed vehicle-restraining member, actuator 318 can be used to lower the restraining member as a unit to release the ICC bar. For a movable vehicle-restraining member, actuator 332 (e.g., a hydraulic cylinder) can be installed to extend between a pin 344 attached to support member 306 and another pin 346 connected to vehicle-restraining member 308. Actuator 332 can extend and retract to rotate vehicle-restraining member 308 about pin 330 connected to support member 306, whereby vehicle-restraining member 308 can pivot between the blocking position (FIGS. 22 and 23) and a retracted, non-blocking position (FIGS. 24a and 24b) for releasing ICC bar 18.

To enable support member 306 to exert an upward reactive force that opposes downward movement of bar 18 and thus dampen or inhibit support member 306 from jouncing, brace 300 includes actuator 318 (e.g., piston/cylinder) that affects the movement of support member 306 relative to dock structure 314. Actuator 318 includes base point 320 that at times (i.e., sometimes or always) is coupled to dock structure 314. Actuator 318 also includes support point 322 that at times (i.e., sometimes or always) is coupled to support member 306.

To permit quick upward movement of support member 306 in response to ICC bar 18 of vehicle 12 suddenly moving upward, and/or to permit quick downward movement of support member 306 in response to bar 18 rapidly forcing member 306 down as vehicle 12 backs into the dock, brace 300 includes release mechanism 304, which in this example enables hydraulic-free motion between support point 322 and support member 306, and in other embodiments enables hydraulic-free motion between base point 320 and dock structure 314. For brace 300, release mechanism 304 comprises a protrusion 324 (support point 322) or some other protrusion that extends from actuator 318 and slides within slot 326 defined by a cam plate 348 of support member 306. Actuator 318 being able to pivot about base point 320 and protrusion 324 being able to slide within slot 326 allows support member 306 to move vertically without actuator 318 having to extend or retract or having to displace hydraulic fluid.

While brace 200 of FIGS. 1-5 includes a tension spring 212 for urging the support member up against ICC bar 18, vehicle brace 300 includes compression spring 328 contained within a telescoping cylindrical housing 350 (FIGS. 22 & 23). Spring 328 extends between support member 306 and base plate 342 to urge support member 306 upward.

Figure 27:
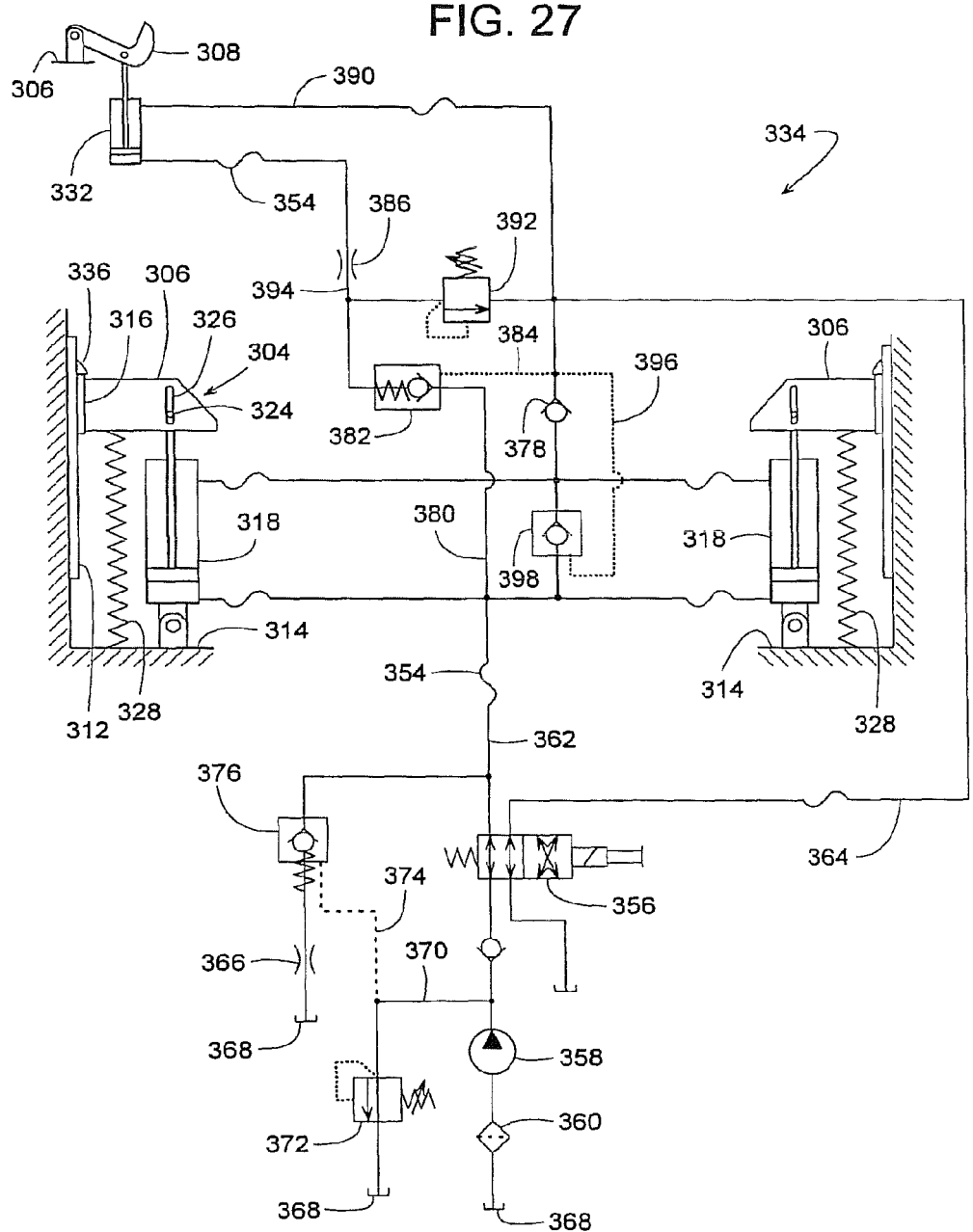
FIG. 27 is a hydraulic schematic that illustrates one example of a circuit for controlling a vehicle brace.

To help prevent theft of vehicle 12 or its trailer by manually forcing support member 306 or vehicle-restraining member 308 away from ICC bar 18, circuit 334 of FIG. 27 holds the pressure within actuators 318 and 332 to help maintain support member 306 and vehicle restraining member 308 at their operating positions of FIGS. 22, 23 and 24c. In one example, it would take at least 200 pounds to force members 306 or 308 down. To prevent someone from defeating the holding feature of vehicle brace 300, one or more metal shields 310 or 352 can be installed adjacent to or incorporated with flexible hydraulic hoses 354 that lead to actuators 318 and/or 332, whereby shields 310 and 352 help protect the hoses from being cut, punctured or otherwise broken. Alternatively, metal braided hose protectors or the like could be utilized.

Although the hydraulic circuit for controlling vehicle brace 300 may vary, in some embodiments, circuit 334 of FIG. 27 is used. A 4-way, 2-position, spring-return solenoid valve 356 generally determines whether a pump 358 (with an upstream filter 360) pressurizes a raise-line 362 or a lower-line 364 to respectively extend or retract cylinders 318 and 332. In the normally stored position of FIG. 24a, hydraulic pump 358 is turned off, and lines 362 and 364 are generally depressurized, which allows spring 328 to raise carriage 316 to upper stop 336 on track 312.

In moving from the position of FIG. 24a to that of FIG. 24b, the hydraulic system is bypassed by virtue of release mechanism 304. More specifically, relative translation between protrusion 324 and slot 326 allows support member 306 to descend quickly without actuator 318 having to displace any hydraulic fluid.

To move from the position of FIG. 24b to that of FIG. 24c, pump 358 is energized while valve 356 is left at its normal spring-returned position to pressurize raise-line 362 and connect lower-line 364 to a generally depressurized tank 368. To maintain or limit the pump's discharge pressure, a line 370 connected to the discharge of pump 358 leads to an adjustable pressure relief valve 372 that can release excess pressure (e.g., >675 psi) to tank 368. A now-pressurized pilot line 374 holds a spring-loaded check valve 376 closed to ensure that pressurized fluid in rise-line 354 does not drain to tank 368 via check valve 376 and a flow restriction 366 (e.g., 0.020" orifice). A hose connects pressurized raise-line 362 to the cylinder end of actuators 318, and the rod end of actuators 318 connects to tank 368 via a check valve 378 and valve 356, thus actuators 318 extend. The extension of actuators 318 raises protrusion 324 to the upper end of slot 326. Upon protrusion 324 reaching its upper travel limit within slot 326, hydraulic pressure in actuators 318 causes support member 306 to temporarily increase the upward force against bar 18, and pressure begins building in a line 380 leading to a spring-loaded check valve 382 that is pilot-operated to open via a pilot line 384. When check valve 382 opens, hydraulic fluid in line 380 travels in series through check valve 382 and a flow restriction 386 (e.g., 0.045" orifice) to extend actuator 332, which raises vehicle restraint 308 at a controlled rate due to restriction 386. A line 390 connects the rod end of actuator 332 to tank 368.

Once in the preparatory position of FIG. 24c, pump 358 can be de-energized manually, or it can be de-energized automatically via a sensor (proximity switch, limit switch, pressure switch etc.) that detects that vehicle brace 300 has been activated and is fully engaged.

To hydraulically support member 306 at its raised position of FIG. 24c, spring-loaded check valve 376 maintains the pressure in raise-line 362 at 50 psi or some other predetermined limit. A pressure relief valve 392 (e.g., set at 2000 psi) not only maintains the restraining member 308 in its raised position, but also prevents damaging high hydraulic pressure buildup when the capacity of flow restriction 366 is exceeded. The locking mechanisms of valves 376 and 392 help prevent someone from manually forcing support member 306 and vehicle restraint 308 away from bar 18.

If adding substantial weight to vehicle 12 causes bar 18 to force support member 306 downward, pressurized fluid in raise-line 362 causes actuator 318 and support member 306 to exert an upward reactive force 340 against bar 18. Hydraulic fluid in excess of 50 psi in raise-line 362 gets forced through restriction 366 to tank 368, whereby the fluid flowing through restriction 366 dampens the descent of bar 18.

If removing substantial weight from vehicle 12 causes bar 18 to suddenly rise, release mechanism 304 (relative translation between protrusion 324 and slot 326) enables spring 328 to raise support member 306 (including restraining member 308) accordingly. In response to bar 18 suddenly rising, a sensor (e.g., proximity sensor, limit switch, pressure switch, etc.) could turn pump 358 back on to extend actuator 318 so that protrusion 324 once again is up against the upper end of slot 326.

After vehicle is loaded or unloaded, bar 18 can be released by energizing pump 358 and actuating valve 356. Actuating valve 356 connects raise-line 362 to tank 368 and connects lower-line 364 to the discharge of pump 358. This pressurizes the rod end of actuators 318 and 332, whereby protrusion 324 retracts from its supporting position of FIG. 24c and restraining member 308 moves to its non-blocking position. Pressure in lower-line 364 pressurizes a pilot line 396, which opens check valve 382 and closes a check valve 398. Check valve 382 being open allows pressurized fluid in the cylinder end of actuator 332 to drain to tank 368 via restriction 386 and valves 382 and 356. Closing check valve 398 allows pressurizing the rod end of actuators 318, and actuated valve 356 allows pressurized fluid in the cylinder end of actuator 318 to drain to tank 368 via valve 356. Thus, pressurizing the rod end of actuators 318 and 332, and depressurizing the cylinder end of actuators 318 and 332, returns vehicle brace 300 to its preparatory position of FIG. 24b, and upon departure of the vehicle from the loading dock, spring 328 returns vehicle brace 300 to its stored position of FIG. 24a.

Figure 28:
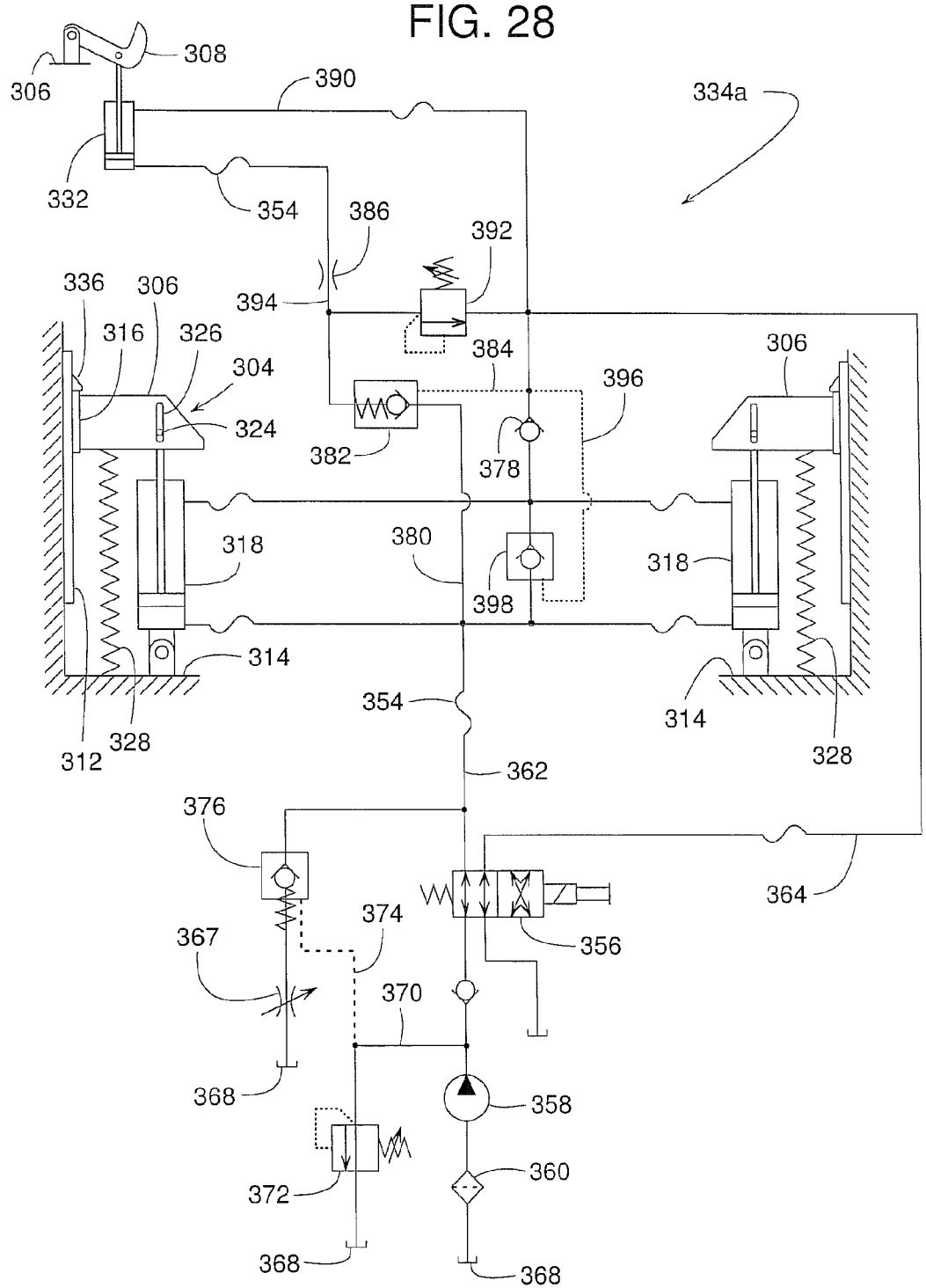
FIG. 28 is a hydraulic schematic that illustrates another example of a circuit for controlling a vehicle brace.
Figure 29:
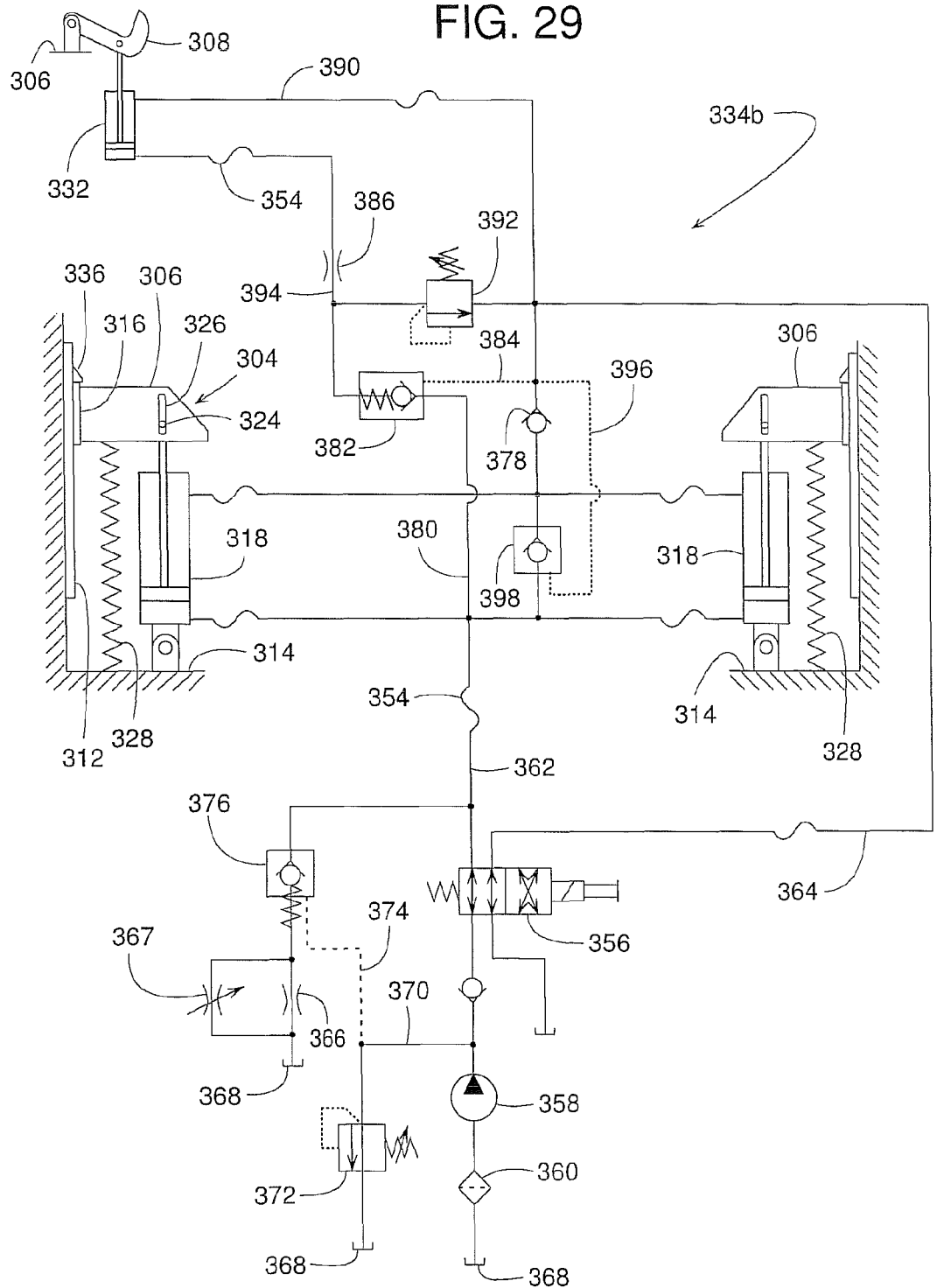
FIG. 29 is a hydraulic schematic that illustrates another example of a circuit for controlling a vehicle brace.
Figure 30:
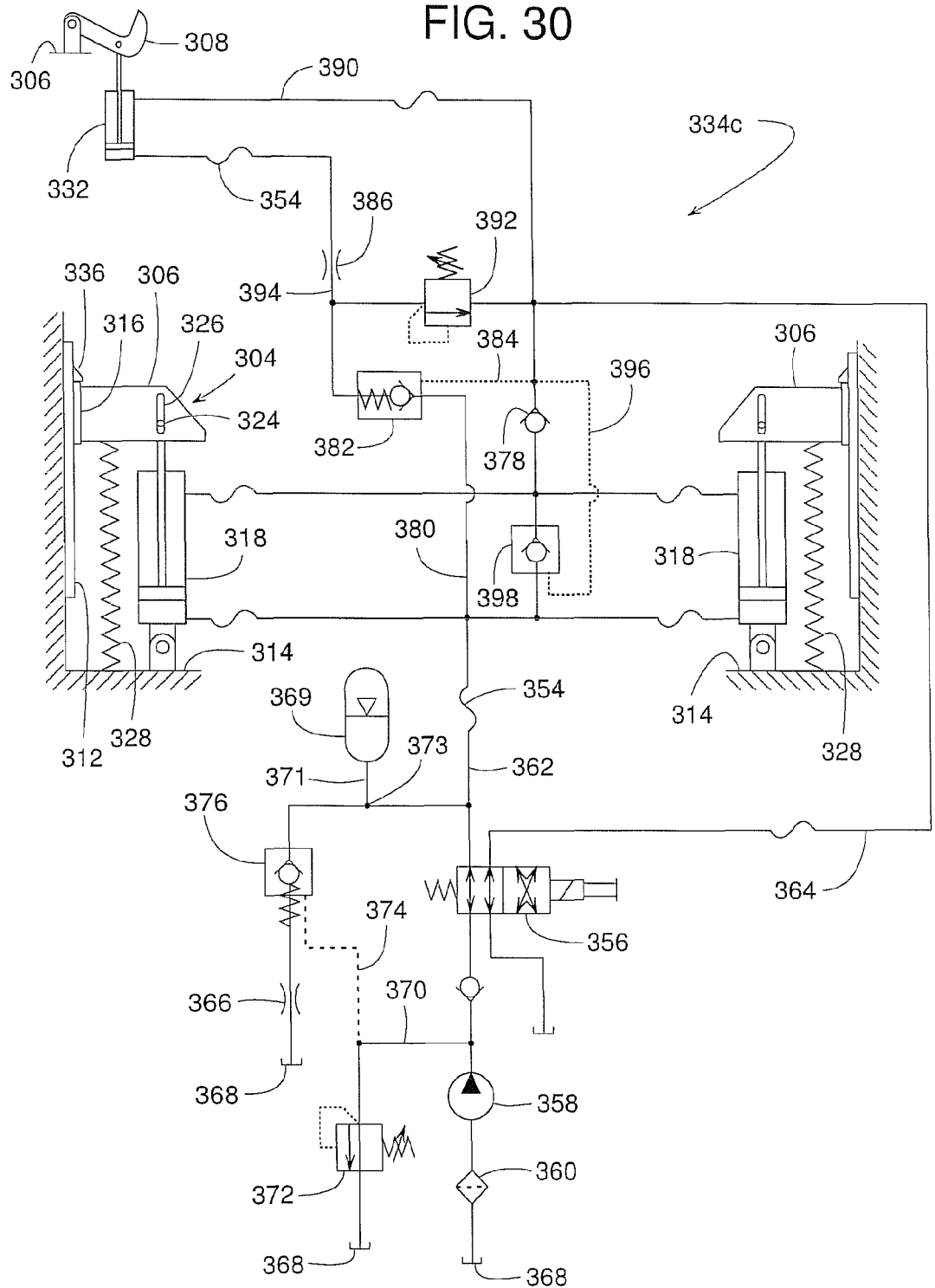
FIG. 30 is a hydraulic schematic that illustrates yet another example of a circuit for controlling a vehicle brace.

Various alternatives to circuit 334 of FIG. 27 are shown in FIGS. 28-30. FIG. 28, for instance, shows a circuit 334a where an adjustable flow restriction 367 (e.g., a needle valve) replaces flow restriction 366. Adjustable flow restriction 367 allows a user to adjust the stiffness of the system as felt by the forklift operator. Adjusting restriction 367 to a more open position, for example, softens the system's response by reducing the fluid pressure differential across restriction 367, thus reducing the reactive force that opposes the vehicle's applied downward force. Adjusting restriction 367 to a more closed position stiffens the system's response by increasing the fluid pressure differential across restriction 367, thus increasing the reactive force opposing the vehicle's downward force.

To prevent a user from closing restriction 367 to a point that completely blocks hydraulic fluid from ever escaping cylinder 318, adjustable flow restriction 367 can be connected in parallel flow relationship with flow restriction 366, as shown by a circuit 334b of FIG. 29. With circuit 334b, flow restriction 366 can continue to provide at least some fluid flow even if adjustable flow restriction 367 is completely closed.

As an alternative or in addition to softening the response of a vehicle brace (e.g., vehicle brace 300), a shock-absorbing accumulator 369 can be added to a circuit 334c, as shown in FIG. 30. While a fixed or variable restriction (e.g., restriction 366 or 367) can dampen the response of the vehicle brace as vehicle 12 descends, accumulator 369 can absorb the shock of a sudden downward movement of vehicle 12. If vehicle 12, for instance, were to abruptly push support member 306 downward, the resulting hydraulic fluid forced out of actuator 318 can quickly escape into accumulator 369 while restriction 366 or 367 controllably releases the fluid to tank 368. Hydraulic fluid flows in and out of accumulator 369 in response to the change in pressure differential across flow restriction 366 or 367. To adjust the action of accumulator 369, an adjustable or fixed flow restriction (similar to restriction 366 or 367) can be added to a line 371 that connects accumulator 369 to a point 373 of circuit 334c.

Figure 31:
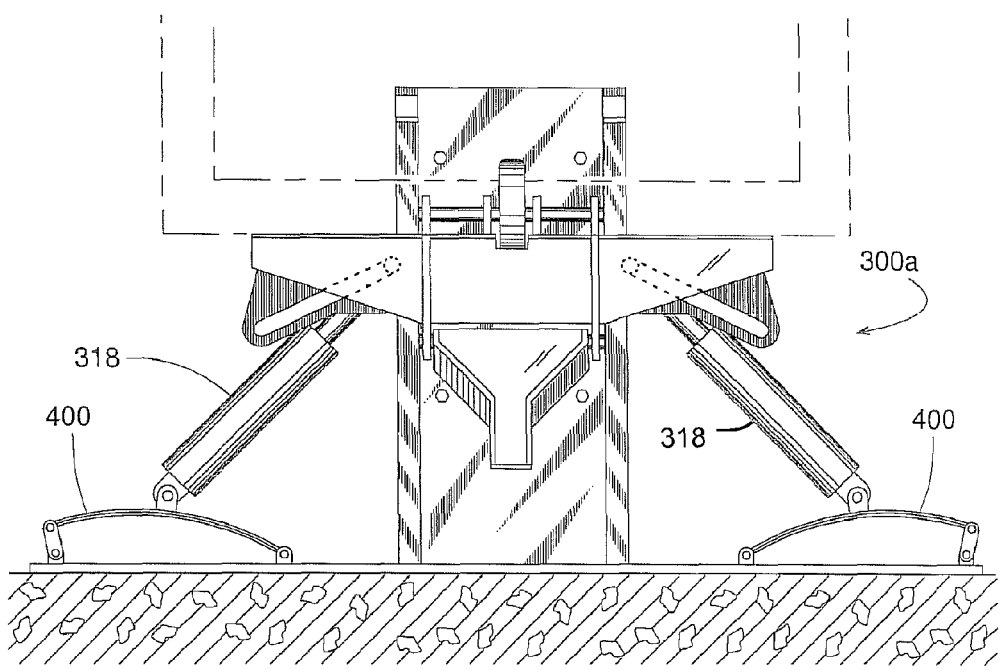
FIG. 31 is a front view similar to FIG. 22 but showing another vehicle brace.
Figure 32:
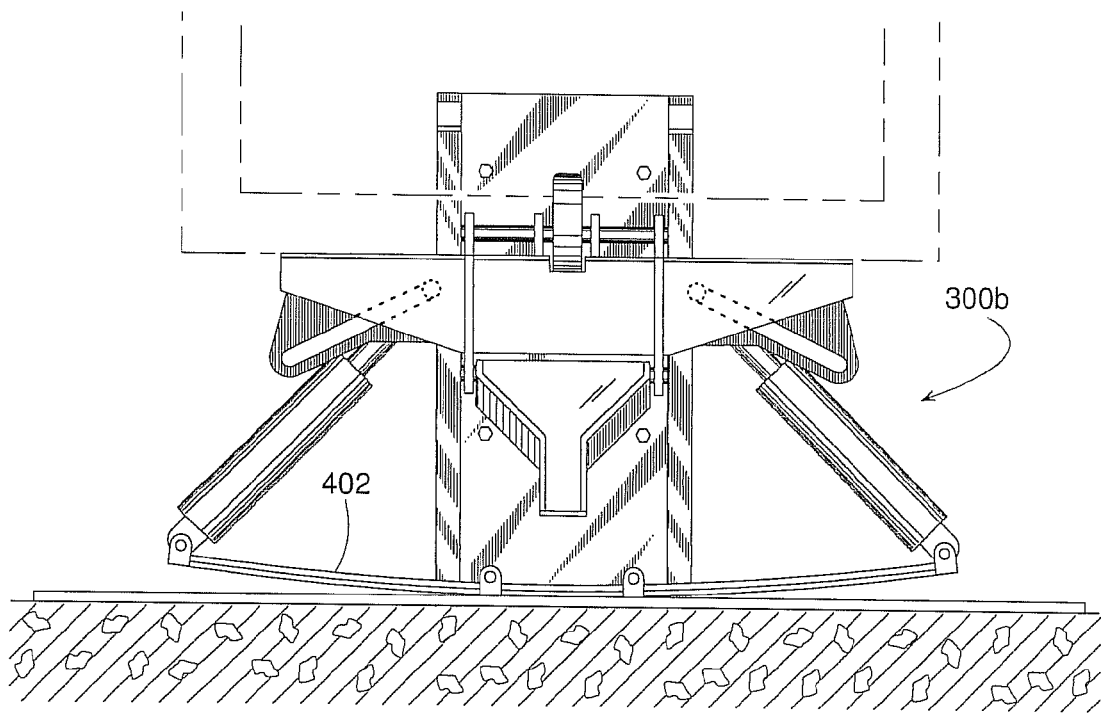
FIG. 32 is a front view similar to FIG. 22 but showing another vehicle brace.

Other shock absorbing systems are shown in FIGS. 31-34. A vehicle brace 300a of FIG. 31 is similar to brace 300 of FIG. 22; however, a leaf spring 400 is installed underneath each actuator 318. While a fixed or variable restriction (e.g., restriction 366 or 367) can still be used for damping the response of brace 300a as vehicle 12 descends, individual springs 400 can help absorb sudden shocks, in a similar manner to that described in regard to FIGS. 19, 19a, 19b, 20, 20a, 20b. A vehicle brace 300b of FIG. 32 operates in a similar manner; however, individual springs 400 are replaced by a single common leaf spring 402.

Figure 33:
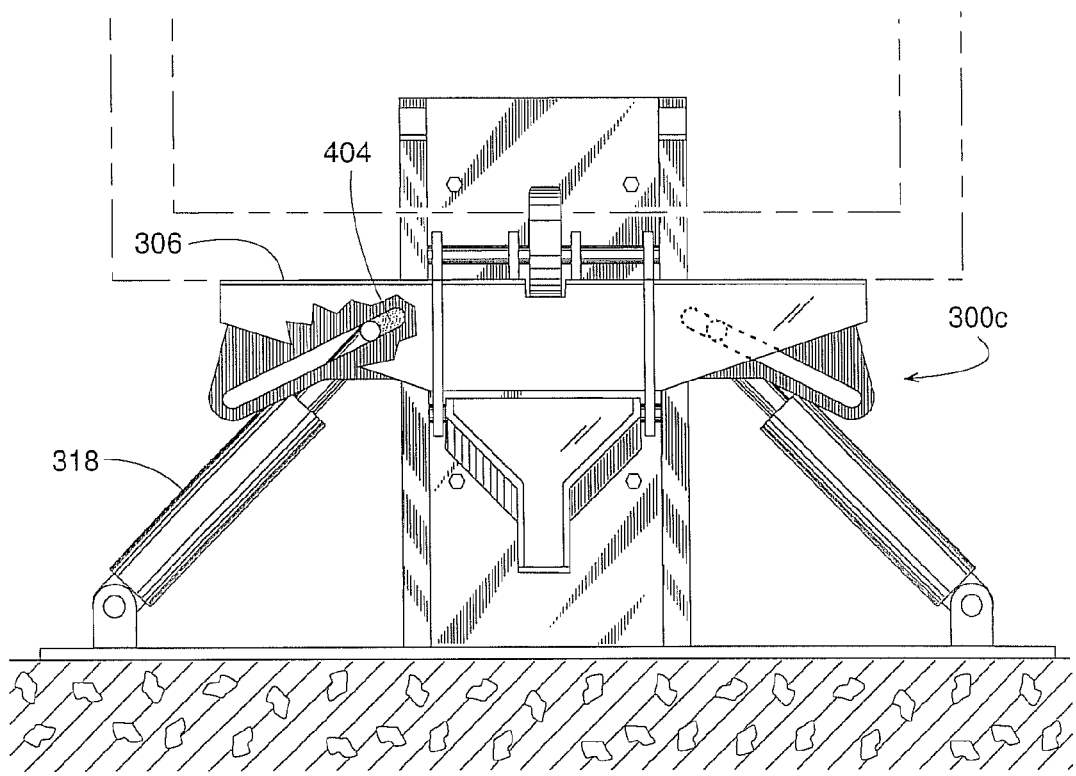
FIG. 33 is a front view similar to FIG. 22 but showing yet another vehicle brace.

Alternatively, a shock absorbing spring 404 of a vehicle brace 300c can be installed at the upper end of each actuator 318 as shown in FIG. 33. In this case, spring 404 is resiliently compressed between actuator 318 and support member 306 in response to vehicle 12 exerting a sudden downward force. Although spring 404 is illustrated as a block of resilient polymeric material (e.g., polyurethane spring), other examples of spring 404 include, but are not limited to, one or more leaf springs, coil springs, air springs, air cylinder springs, series of Belleville washers, etc.

Figure 34:
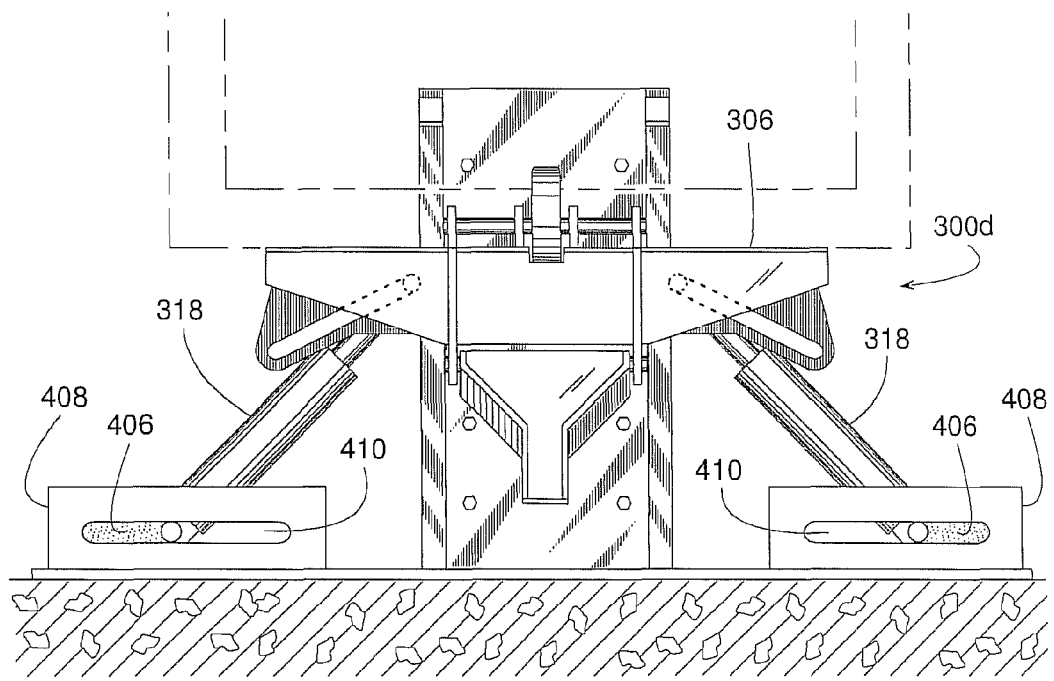
FIG. 34 is a front view similar to FIG. 22 but showing yet another vehicle brace.

In yet another embodiment, shown in FIG. 34, a vehicle brace 300d includes a spring 406 disposed at the lower end of each actuator 318. In response to vehicle 12 exerting a sudden downward force against support member 306, spring 406 is resiliently compressed between actuator 318 and a base member 408 that defines a track 410 along which the lower end of actuator 318 can travel. Although spring 406 is illustrated as a block of resilient polymeric material (e.g., polyurethane spring), other examples of spring 406 include, but are not limited to, one or more leaf springs, coil springs, air springs, air cylinder springs, series of Belleville washers, etc.

Although the invention is described with reference to various embodiments, it should be appreciated by those skilled in the art that various modifications are well within the scope of the invention. For example, although various vehicle braces are shown to include a hook that helps prevent a vehicle from accidentally pulling away from the loading dock, such a hook is optional. An important feature of the invention is inhibiting and/or resisting vertical movement of a vehicle at a loading dock. Therefore, the scope of the invention is to be determined by reference to the claims that follow.

What is claimed is:

1. A vehicle brace for a vehicle that tends to move vertically in response to being loaded or unloaded at a loading dock, the vehicle brace comprising:

a support member coupled to a base and being movable relative to the base;

a first control system comprising a first resilient element to continuously urge the support member toward a preparatory position away from the base, the preparatory position being adjacent the vehicle so that the vehicle is able to exert an applied force against the support member that urges the support member downward from the preparatory position when the vehicle engages the support member and the first control system urges the support member away from the base when the vehicle disengages the support member; and a second control system comprising a second resilient element and an actuator coupled to the support member, the second resilient element operatively coupled to the actuator to enable the support member to exert against the vehicle a first reactive force that opposes the applied force in a first allowable range, and the actuator controlled to exert against the vehicle a second reactive force that opposes the applied force when the applied force exceeds the first allowable range such that the support member appreciably slows a descent of the vehicle when the vehicle moves downwardly, wherein the second control system operates independently from the first control system.

2. The vehicle brace of claim 1, wherein the second resilient element is between the base and the actuator.

3. The vehicle brace of claim 1, wherein the second resilient element is between the support member and the actuator.

4. The vehicle brace of claim 1, wherein the second resilient element is comprised of a resilient polymeric material.

5. The vehicle brace of claim 1, wherein the second resilient element is a leaf spring.

6. The vehicle brace of claim 1, wherein the actuator is a hydraulic cylinder.

7. The vehicle brace of claim 1, wherein the actuator is controlled by a flow restrictor in fluid communication with the actuator to provide a pressure differential to fluid flowing from the actuator that enables the support member to exert the second reactive force against the vehicle.

8. The vehicle brace of claim 1, wherein the first resilient element is to provide a linear force to the support member and the actuator is to provide a non-linear force to the support member.

9. The vehicle brace of claim 1, wherein a first end of the actuator is operatively coupled to a slot of the support member.

10. The vehicle brace of claim 1, wherein the base is maintained at a fixed distance relative to the loading dock.

* * * * *

UNITED STATES PATENT AND TRADEMARK OFFICE
CERTIFICATE OF CORRECTION

PATENT NO. : 8,657,551 B2
APPLICATION NO. : 11/772445
DATED : February 25, 2014
INVENTOR(S) : Andersen et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1374 days.

Signed and Sealed this
Ninth Day of June, 2015

Michelle K. Lee
*Director of the United States Patent and Trademark Office*